(12) United States Patent
Takayama et al.

(10) Patent No.: US 12,703,087 B2
(45) Date of Patent: Aug. 11, 2026

(54) SUBSTRATE TRANSFER ROBOT AND SUBSTRATE PROCESSING APPARATUS INCLUDING SUBSTRATE TRANSFER ROBOT

(71) Applicant: SCREEN Holdings Co., Ltd., Kyoto (JP)

(72) Inventors: Yuichi Takayama, Kyoto (JP); Hiroyuki Kawahara, Kyoto (JP); Takuya Sato, Kyoto (JP)

(73) Assignee: SCREEN Holdings Co., Ltd., Kyoto (JP)

(*) Notice: Subject to any disclaimer, the term of this patent is extended or adjusted under 35 U.S.C. 154(b) by 54 days.

(21) Appl. No.: 18/961,897

(22) Filed: Nov. 27, 2024

(65) Prior Publication Data

US 2025/0170707 A1 May 29, 2025

(30) Foreign Application Priority Data

Nov. 29, 2023 (JP) ................................ 2023-202094

(51) Int. Cl.
*B25J 9/16* (2006.01)
*B25J 11/00* (2006.01)
(Continued)

(52) U.S. Cl.
CPC ......... *B25J 9/1612* (2013.01); *B25J 11/0095* (2013.01); *B25J 13/085* (2013.01); *B25J 15/0042* (2013.01)

(58) Field of Classification Search
CPC .... B25J 9/1612; B25J 11/0095; B25J 13/085; B25J 15/0042; B25J 9/0009; B25J 13/088;
(Continued)

(56) References Cited

U.S. PATENT DOCUMENTS 6,491,330 B1 * 12/2002 Mankame ........... H10P 72/7602 294/196
2011/0187140 A1 * 8/2011 Hashimoto .............. B25J 15/00 294/103.1

(Continued)

FOREIGN PATENT DOCUMENTS

JP 2006-310709 A 11/2006
JP 2021-048359 A 3/2021

(Continued)

OTHER PUBLICATIONS

Office Action dated Aug. 13, 2025 for corresponding Korean Patent Application No. 10-2024-0172312.

*Primary Examiner* — Esvinder Singh
(74) *Attorney, Agent, or Firm* — OSTROLENK FABER LLP

(57) ABSTRACT

A substrate transfer robot includes a hand and a robot control unit. The hand includes: four guides (including a guide disposed on a distal end of the hand body) that are provided on the top surface of a hand body, and receive an outer edge portion of the substrate; a pusher disposed on a proximal end of the hand body; a pusher actuator that moves the pusher horizontally; and a weight sensor unit that measures the weight of the substrate placed on the hand. The guides and the pusher together grip the horizontally-orientated substrate on the four guides by clasping the substrate in the horizontal direction. The robot control unit changes the gripping force for gripping the substrate placed on the four guides, by controlling the pusher actuator depending on the weight measured by the weight sensor unit.

14 Claims, 11 Drawing Sheets

(51) Int. Cl.
*B25J 13/08* (2006.01)
*B25J 15/00* (2006.01)

(58) Field of Classification Search
CPC . B25J 19/02; B25J 9/1664; B25J 13/08; B25J 15/0014; B25J 9/1602; B25J 9/1669; B25J 9/1679; B25J 13/081; B25J 13/082; B25J 13/084; H10P 72/0604; H10P 72/7606; H10P 72/3402; H10P 72/74; H10P 72/7602; H10P 72/30; H10P 72/3306; H10P 72/70; H10P 72/76
See application file for complete search history.

(56) References Cited

U.S. PATENT DOCUMENTS

| | | | | |
|---|---|---|---|---|
| 2013/0321973 | A1* | 12/2013 | Wiltsche | H10P 72/722 361/234 |
| 2019/0067075 | A1* | 2/2019 | Fukushima | H10P 72/7602 |
| 2019/0148209 | A1 | 5/2019 | Liu et al. | |
| 2020/0246985 | A1 | 8/2020 | Yoshida et al. | |
| 2021/0090927 | A1 | 3/2021 | Takayama et al. | |
| 2022/0395986 | A1 | 12/2022 | Blank et al. | |
| 2023/0116525 | A1* | 4/2023 | Yamada | B65G 47/90 414/751.1 |
| 2025/0079216 | A1* | 3/2025 | Kondoh | H10P 72/3206 |

FOREIGN PATENT DOCUMENTS

| | | | |
|---|---|---|---|
| JP | 6956348 | B2 | 11/2021 |
| JP | 2022-091240 | A | 6/2022 |
| KR | 10-2004-0063301 | A | 7/2004 |
| KR | 10-2011-0061499 | A | 6/2011 |
| TW | 201910082 | A | 3/2019 |
| TW | 201918346 | A | 5/2019 |
| TW | 202130480 | A | 8/2021 |

* cited by examiner

IR
21
39
39F
39E
39A
51
37
37A
41
31
43
H1
33B
35B(35)
W
33A
47
48
35A(35)
H2
LIFT STAGE
25
ARTICULATED ARM
23
ROBOT CONTROL UNIT
27
STORAGE UNIT
29
MAIN CONTROL UNIT
71

FIG. 11

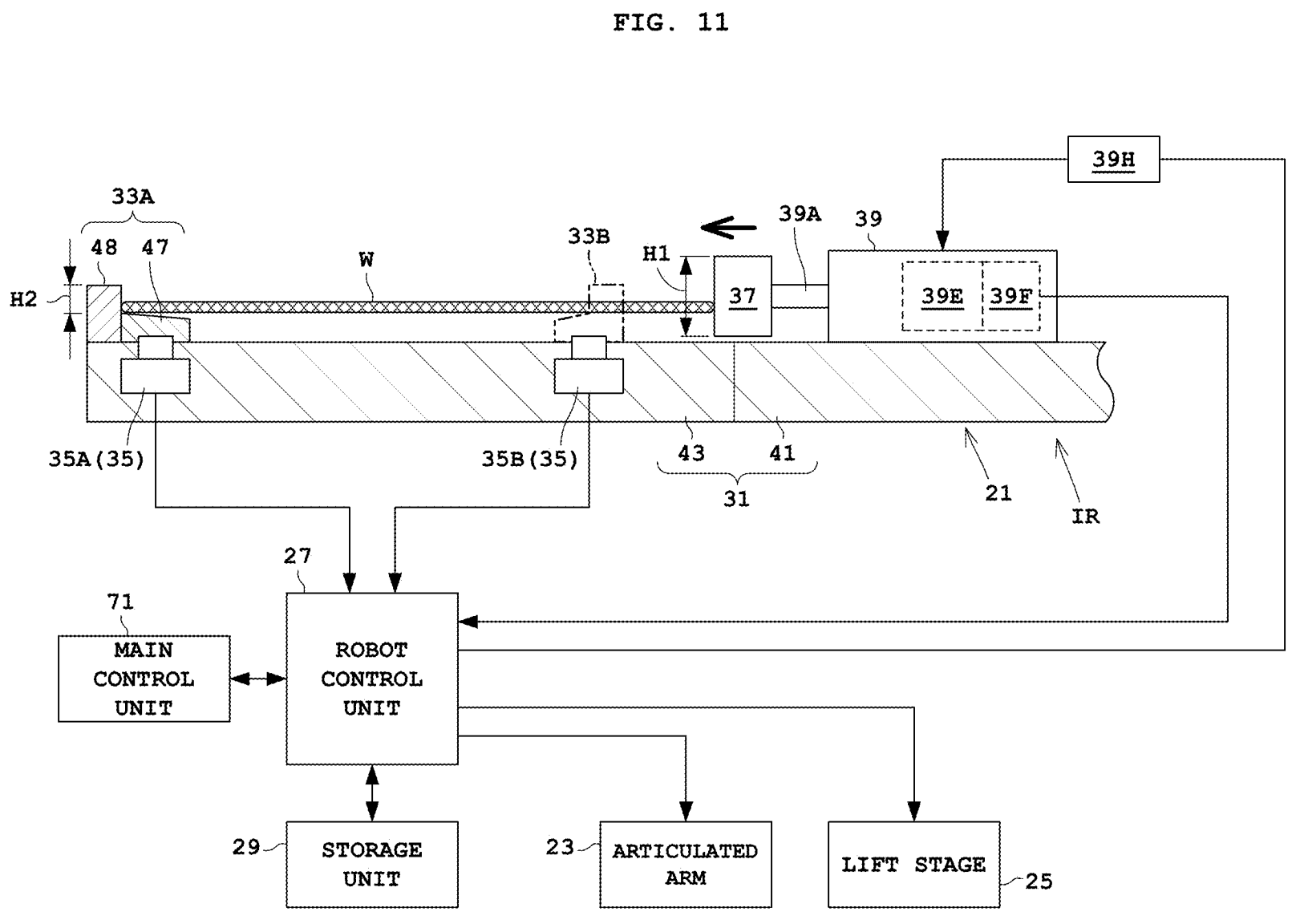

39H
39F
39E
39
39A
37
IR
21
41
43
31
H1
33B
35B(35)
W
33A
47
48
35A(35)
H2
LIFT STAGE
25
ARTICULATED ARM
23
ROBOT CONTROL UNIT
27
STORAGE UNIT
29
MAIN CONTROL UNIT
71

SUBSTRATE TRANSFER ROBOT AND SUBSTRATE PROCESSING APPARATUS INCLUDING SUBSTRATE TRANSFER ROBOT

CROSS-REFERENCE TO RELATED APPLICATIONS

This application claims priority to Japanese Patent Application No. 2023-202094 filed Nov. 29, 2023, the subject matter of which is incorporated herein by reference in entirety.

BACKGROUND

Technical Field

The present invention relates to a substrate transfer robot that transfers a substrate, and a substrate processing apparatus including the substrate transfer robot. Examples of such a substrate include a semiconductor substrate, a substrate for a flat panel display (FPD), a glass substrate for a photomask, a substrate for an optical disk, a substrate for a magnetic disk, a ceramic substrate, and a substrate for a solar cell. Examples of the FPD include a liquid crystal display device and an organic electroluminescence (EL) display device.

Related Art

A conventional substrate processing apparatus includes a transfer mechanism that transfers a substrate (see, for example, JP 2021-048359 A). The transfer mechanism includes a hand and a hand driving unit. The hand supports one substrate in a horizontal orientation. The hand driving unit moves the hand.

JP 2022-091240 A discloses a substrate transfer robot including a robot hand. The robot hand includes a Y-shaped hand body that is a portion where a substrate is placed. The hand body is provided with three tactile sensors coming into contact with and supporting the bottom surface of the substrate. The sensor elements of the tactile sensors can detect a force applied from the substrate in three axial directions (the X-axis direction, the Y-axis direction, and the Z-axis direction).

SUMMARY

However, the conventional substrate processing apparatuses have following problems. The substrate transfer robot includes a hand that grips (grasps) a substrate, in order to transfer the substrate. The hand includes a guide that receives an outer edge portion of the substrate, and a pusher that is capable of coming into contact with a side surface of the substrate. The hand grips a horizontally-oriented substrate between the guide and the pusher by clasping the substrate in the horizontal direction so that the substrate does not fall from the hand while the substrate is being transferred.

Meanwhile, there are various types (shapes) of substrates. For example, the types of substrates for manufacturing a power device include an ordinary circular substrate having a uniform thickness (hereinafter, referred to as "ordinary substrate", as appropriate) and a circular substrate having a thick peripheral portion and a thinner inner portion (hereinafter, referred to as a "thick edge substrate", as appropriate). The thick edge substrate is relatively weak. Therefore, if the hand grips the thick edge substrate, the thick edge substrate may become damaged.

The present invention has been made in view of the situation described above, and an object of the present invention is to provide a substrate transfer robot and a substrate processing apparatus including the substrate transfer robot capable of preventing a damage of a substrate.

In order to achieve such an object, the present invention uses the following configurations. That is, a substrate transfer robot according to the present invention is a substrate transfer robot that transfers a substrate, the substrate transfer robot including:

a hand capable of gripping the substrate in a horizontal orientation; and a controller, in which the hand includes:

a hand body;

a plurality of guides provided on a top surface of the hand body and receiving an outer edge portion of the substrate, and including a distal guide disposed on a distal end of the hand body;

a pusher disposed on a proximal end of the hand body and capable of coming into contact with a side surface of the substrate;

a pusher actuator that moves the pusher horizontally; and a weight sensor unit that measures a weight of the substrate placed on the hand, and the distal guide and the pusher are caused by the pusher actuator to grip the substrate that is in the horizontal orientation on the plurality of guides, by clasping the substrate in the horizontal direction, and the controller changes a gripping force for gripping the substrate on the plurality of guides by controlling the pusher actuator depending on the weight measured by the weight sensor unit.

A substrate transfer robot according to the present invention includes a weight sensor unit that measures the weight of a substrate placed on a hand. The controller changes the gripping force for gripping the substrate that is on the plurality of guides by controlling the pusher actuator depending on the weight measured by the weight sensor unit. As a result, the substrate can be gripped at a gripping force suitable for the weight of the substrate. Therefore, it is possible prevent a damage of the substrate.

Furthermore, in the substrate transfer robot described above, when the weight measured by the weight sensor unit is more than a first threshold, the controller preferably controls the pusher actuator to achieve a first gripping state in which the substrate on the plurality of guides is gripped at a first gripping force.

When the weight measured by the weight sensor unit is more than the first threshold, the pusher actuator moves the pusher in the horizontal direction. With this, the horizontally-oriented substrate on the plurality of guides is gripped by being clasped in the horizontal direction. That is, a substrate having a weight more than the first threshold is regarded as a substrate that is strong enough, and the hand grips such a substrate selectively. Therefore, it is possible to prevent a damage of the substrate.

Furthermore, in the substrate transfer robot described above, when the weight measured by the weight sensor unit is less than the first threshold, the controller preferably controls the pusher actuator to achieve a first non-gripping state in which the substrate is placed on the plurality of guides without being gripped on the plurality of guides.

When the weight measured by the weight sensor unit is less than the first threshold, the substrate is not gripped by the movement of the pusher by the pusher actuator. That is, a substrate having a weight less than the first threshold is regarded as a substrate that is not strong enough, so that the hand does not grip the substrate. Therefore, it is possible to prevent a damage of the substrate.

Preferably, the substrate transfer robot further includes a hand actuator that moves the hand, and the controller changes a transfer speed of the hand by controlling the hand actuator depending on the weight measured by the weight sensor unit.

The controller changes the transfer speed of the hand by controlling the hand actuator depending on the weight measured by the weight sensor unit. As a result, it is possible to transfer the substrate at a transfer speed suitable for the weight of the substrate, while gripping the substrate with a gripping force suitable for the weight of the substrate. If the transfer speed is fixed at a speed low enough not for the substrate to fall off from the hand, the efficiency of transfer of the substrate deteriorates. However, because the transfer speed is changed depending on the weight, it is possible to improve the transfer efficiency of the substrate while preventing a damage of the substrate.

Preferably, the substrate transfer robot further includes a hand actuator that moves the hand, the controller controls the hand actuator to move the hand in the first gripping state at a first speed, and the controller controls the hand actuator to move the hand in the first non-gripping state at a second speed that is lower than the first speed.

For example, the hand does not grip the substrate that is not strong enough. Therefore, because there is a possibility that the substrate falls off from the hand, the substrate transfer robot needs to transfer the hand having such a substrate at a low speed. Furthermore, conventional substrate transfer robots cannot distinguish substrates that are strong enough from those that are not strong enough. Therefore, such a substrate transfer robot needs to transfer a substrate that is strong enough at a low speed that is the speed for transferring a substrate that is not strong enough. As a result, the transfer efficiency of the substrate deteriorates.

According to the present invention, the substrate transfer robot can distinguish a substrate that is strong enough from a substrate that is not strong enough. Therefore, the substrate transfer robot can transfer a substrate that is strong enough at a first speed, and can transfer a substrate that is not strong enough at the second speed (low speed) lower than the first speed. Therefore, the transfer efficiency of the substrate can be improved.

Furthermore, in the substrate transfer robot described above, when the weight measured by the weight sensor unit is less than the first threshold, the controller preferably controls the pusher actuator to achieve a second non-gripping state in which the pusher is moved closer to the substrate placed on the plurality of guides.

When the weight measured by the weight sensor unit is less than the first threshold, the pusher actuator brings the pusher closer to the substrate. That is, a substrate having a weight less than the first threshold is regarded as a substrate that is not strong enough, so that the hand does not grip the substrate, but the pusher is moved closer to the substrate. As a result, because the pusher is held closely to the substrate, it is possible to prevent the substrate from being damaged, while preventing the substrate from falling off from the hand while the substrate is being transferred.

Furthermore, in the substrate transfer robot described above, when the weight measured by the weight sensor unit is less than the first threshold, the controller preferably controls the pusher actuator to achieve a second gripping state in which the substrate on the plurality of guides are gripped at a second gripping force that is weaker than the first gripping force.

When the weight measured by the weight sensor unit is less than the first threshold, the substrate is gripped at the second gripping force, not at the first gripping force, with the movement of the pusher by the pusher actuator. That is, a different gripping force is used between a substrate that is strong enough and a substrate that is not strong enough. As a result, it is possible to prevent the substrate from being damaged while preventing the substrate from falling off from the hand when the substrate is being transferred.

Furthermore, in the substrate transfer robot described above, when the weight measured by the weight sensor unit is more than a second threshold that is greater than the first threshold, the controller preferably controls the pusher actuator to achieve a third gripping state in which the substrate on the plurality of guides is gripped at a third gripping force different from the first gripping force.

When the weight measured by the weight sensor unit is more than the second threshold (second threshold>first threshold), the substrate is gripped at the third gripping force that is different from the first gripping force, with the movement of the pusher by the pusher actuator. As a result, by further distinguishing the substrates that are strong enough into two types of substrates, it is possible to set the optimum gripping force for each of these two types of substrates.

Furthermore, in the substrate transfer robot described above, it is preferable that: the substrate includes a bonded substrate; the bonded substrate includes a silicon substrate made of silicon and a support substrate made of glass and bonded to a bottom surface of the silicon substrate; the support substrate has a diameter larger than a diameter of the silicon substrate; the bonded substrate has a weight more than the second threshold; and the third gripping force is set to be weaker than the first gripping force.

Because glass is more brittle than silicon, the support substrate may be become damaged. Therefore, a bonded substrate having a weight more than the second threshold is gripped at the third gripping force that is weaker than the first gripping force. In this manner, it is possible to prevent a damage of a bonded substrate.

Furthermore, in the substrate transfer robot described above, it is preferable that: the weight sensor unit includes a plurality of weight sensors; the plurality of weight sensors are provided in the respective plurality of guides; each of the plurality of weight sensors measures a weight of the substrate exerted on corresponding one of the plurality of guides; and when a representative value of a plurality of weights measured by the plurality of respective weight sensors is more than the first threshold, the controller controls the pusher actuator to achieve the first gripping state in which the substrate on the plurality of guides is gripped at the first gripping force.

The weight sensor unit includes a plurality of weight sensors, and the plurality of weight sensors are provided in the plurality of respective guides. As a result, the weight of the substrate can be measured accurately.

In the substrate transfer robot described above, an example of the representative value is a sum. In the substrate transfer robot, another example of the representative value is an average.

In the substrate transfer robot described above, preferably, the weight sensor unit includes a weight sensor, the weight sensor is provided to any one of the plurality of guides, and when a weight measured by the weight sensor is more than the first threshold, the controller controls the pusher actuator to achieve the first gripping state in which the substrate on the plurality of guides is gripped at the first gripping force. Because the weight sensors in the number equal to the number of the plurality of guides do not have to be provided, the configuration of the hand can be simplified.

Furthermore, a substrate processing apparatus according to the present invention includes the substrate transfer robot described above, and a processing unit that performs preset processing on the substrate transferred by the substrate transfer robot.

With the substrate transfer robot and the substrate processing apparatus including the substrate transfer robot according to the present invention, it is possible to prevent a damage of a substrate.

BRIEF DESCRIPTION OF DRAWINGS

For the purpose of illustrating the invention, there are shown in the drawings several forms which are presently preferred, it being understood, however, that the invention is not limited to the precise arrangement and instrumentalities shown.

FIG. 11 is a diagram for explaining a configuration of and control performed by the substrate transfer robot according to a third embodiment;

DETAILED DESCRIPTION

First Embodiment

Figure 1:
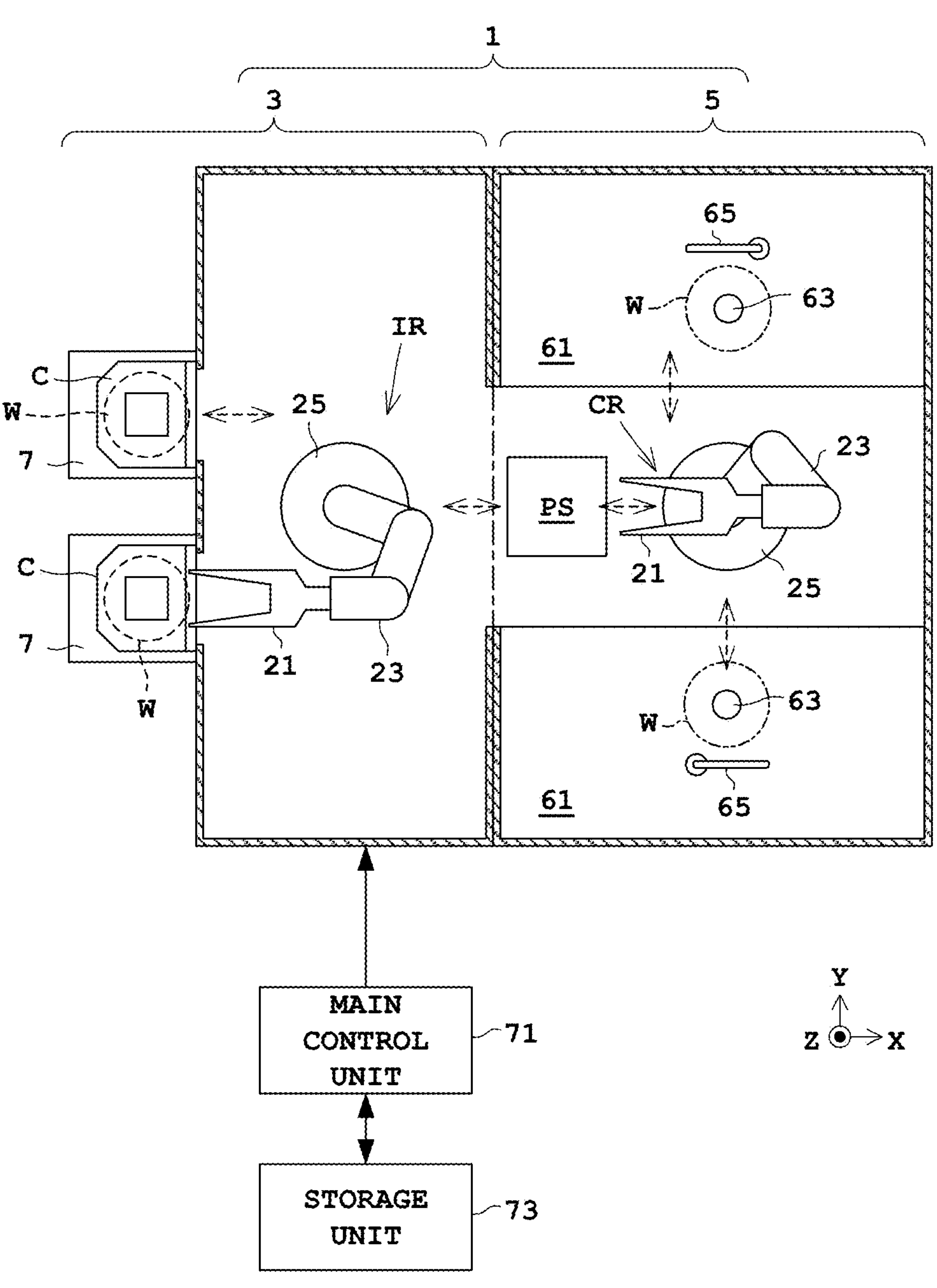
FIG. 1 is a plan view illustrating a schematic configuration of a substrate processing apparatus according to a first embodiment.

A first embodiment of the present invention will now be described with reference to drawings. FIG. 1 is a plan view illustrating a schematic configuration of a substrate processing apparatus 1 according to the first embodiment.

<1. Configuration of Substrate Processing Apparatus>

FIG. 1 will now be referred to. The substrate processing apparatus 1 processes a substrate W. The substrate processing apparatus 1 includes an indexer block 3 and a processing block 5. The indexer block 3 includes a plurality of (e.g., two) carrier tables 7 and a substrate transfer robot IR. Note that an X direction is the horizontal direction in which the indexer block 3 and the processing block 5 are aligned. A Y direction (width direction) is the horizontal direction in which the plurality of carrier tables 7 are aligned. The Y direction is orthogonal to the X direction.

A carrier C is placed on each of the two carrier tables 7. One example of the carrier C is a front opening unified pod (FOUP), but without limitation thereto. The carrier C houses a plurality of substrates W. The carrier C may house various types of substrates W, for example. Types of the substrate W will now be described.

Figure 2:
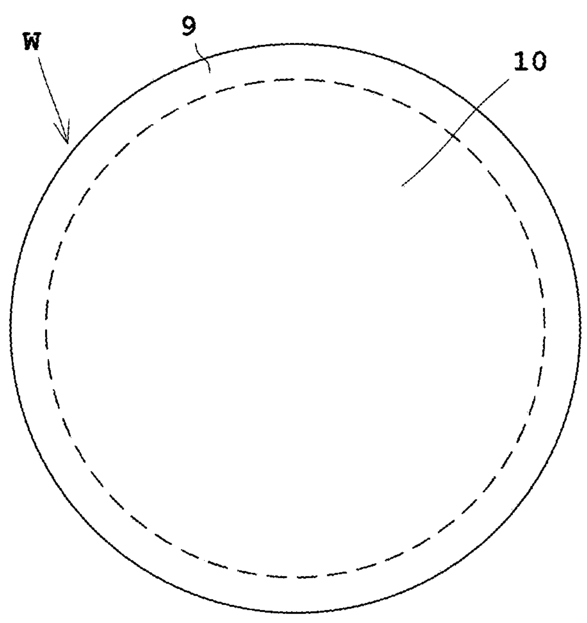
FIG. 2 is a plan view of the substrate.

FIG. 2 is a plan view of the substrate W. A basic shape of the substrate W will now be explained. Each substrate W has a disk-like shape, for example. The substrate W has a peripheral portion 9 and a main portion 10. The main portion 10 is a portion located inside the peripheral portion 9. In FIG. 2, the boundary between the peripheral portion 9 and the main portion 10 is indicated by a broken line.

FIGS. 3A to 3D will now be referred to. The substrates W are classified into a plurality of types, depending on their shapes. For example, the substrates W include an ordinary substrate WA, a thick edge substrate WB, a first bonded substrate WC, and a second bonded substrate WD. When the ordinary substrate WA, the thick edge substrate WB, the first bonded substrate WC, and the second bonded substrate WD are not distinguished from one another, these substrates will be referred to as the substrates W.

Figure 3A:
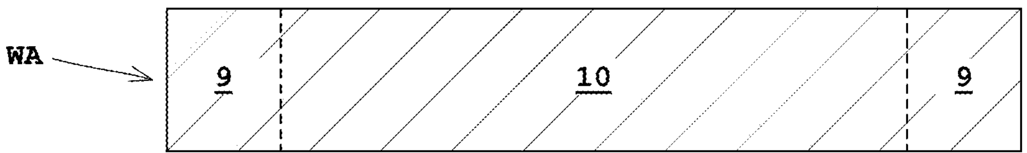
FIG. 3A is a longitudinal sectional view illustrating an ordinary substrate that is an example of a substrate.

FIG. 3A will now be referred to. The ordinary substrate WA is an ordinary circular substrate having a uniform thickness. That is, the ordinary substrate WA is a substrate in which the thickness of the peripheral portion 9 is the same as the thickness of the main portion 10. The ordinary substrate WA is formed of silicon, for example, but it is also possible for the ordinary substrate WA not to be formed of silicon. The ordinary substrate WA is a substrate W conforming to the Semiconductor Equipment and Materials International (SEMI) standard. For example, an ordinary substrate WA has a diameter of 300 mm (millimeters), and a thickness of 0.775 mm.

Figure 3B:
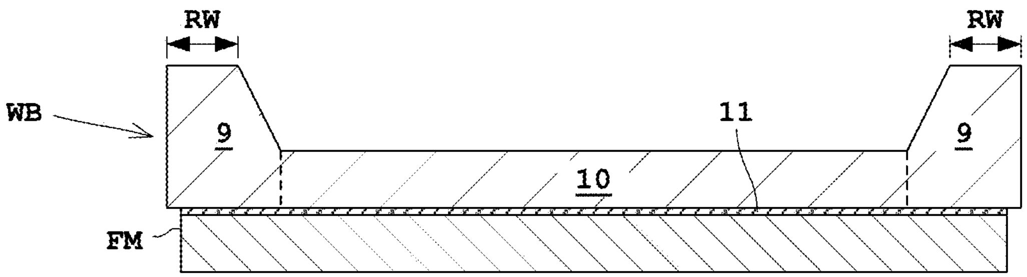
FIG. 3B is a longitudinal sectional view illustrating a thick edge substrate that is another example of a substrate.

FIG. 3B will now be referred to. The thick edge substrate WB is a circular substrate having a thicker peripheral portion 9 and a thinner inner portion (main portion 10). On the top surface of the main portion 10, a rear surface grinding process (back grinding process) has been performed. A ring width RW of the top surface of the peripheral portion 9 is, for example, 3 mm. As illustrated in FIG. 3B, a flexible resin film FM may be bonded to the bottom surface of the thick edge substrate WB, but it is also possible for the resin film FM not to be provided. The resin film FM is bonded to the thick edge substrate WB via an adhesive layer 11. The resin film FM has a disk-like shape. The thickness of the resin film FM is substantially the same as the thickness of the main portion 10, for example. The bottom surface of the thick edge substrate WB is a device surface (semiconductor device surface) on which devices are formed.

Figure 3C:
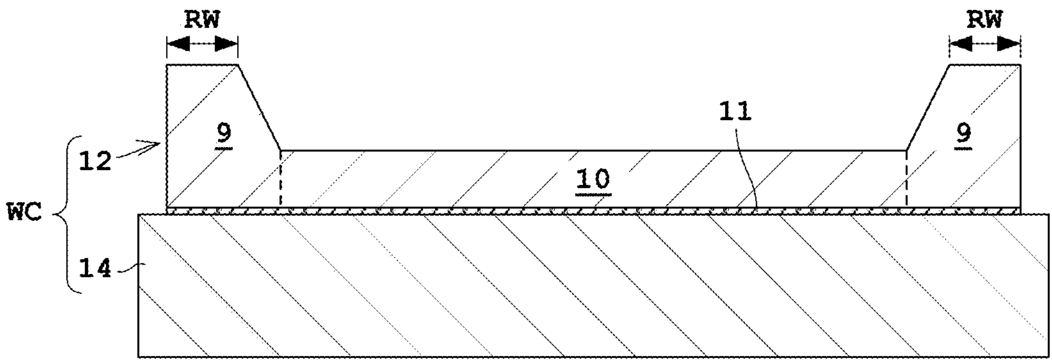
FIG. 3C is a longitudinal sectional view illustrating a first bonded substrate that is another example of a substrate.

FIG. 3C will now be referred to. The first bonded substrate WC includes a thick edge substrate 12 and a support substrate 14. The thick edge substrate 12 is configured in substantially the same manner as the thick edge substrate WB, but without the resin film illustrated in FIG. 3B. On the bottom surface of the thick edge substrate 12, devices are formed. The thick edge substrate 12 is made of silicon, but may be made of a material other than silicon. The support substrate 14 is bonded to the bottom surface of the thick edge substrate 12. The support substrate 14 is bonded to the thick edge substrate 12 via the adhesive layer 11. The support substrate 14 is made of glass, but may be made of a material other than glass. The support substrate 14 has a diameter (e.g., 301 mm) larger than the diameter of the thick edge substrate 12 (e.g., 300 mm), for example.

Figure 3D:
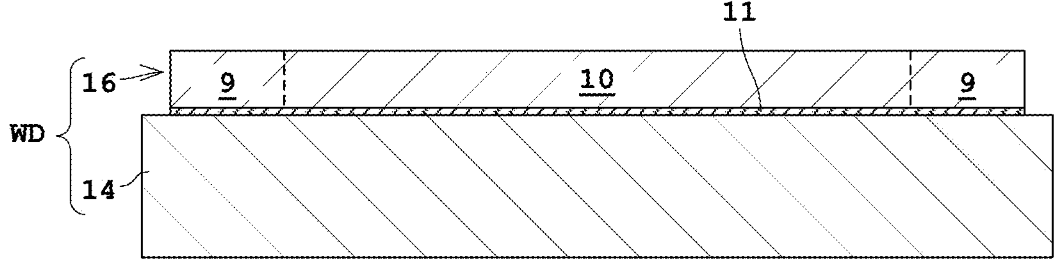
FIG. 3D is a longitudinal sectional view illustrating a second bonded substrate that is another example of a substrate.

FIG. 3D will now be referred to. The second bonded substrate WD includes an entirely-thin substrate 16 and a support substrate 14. In the entirely-thin substrate 16, the rear surface grinding process is performed on the top surfaces of the peripheral portion 9 and the main portion 10. The entirely-thin substrate 16 is usually thinner than the ordinary substrate WA. The entirely-thin substrate 16 is thinner than the support substrate 14. The entirely-thin substrate 16 is a substrate in which the thickness of the peripheral portion 9 is the same as the thickness of the main portion 10. On the bottom surface of the entirely-thin substrate 16, devices are formed. The entirely-thin substrate 16 is made of silicon, but may be made of a material other than silicon. The support substrate 14 of the second bonded substrate WD has the same configuration as the support substrate 14 of the first bonded substrate WC.

The first bonded substrate WC and the second bonded substrate WD correspond to a bonded substrate according to the present invention. The thick edge substrate 12 made of silicon and the entirely-thin substrate 16 made of silicon correspond to a silicon substrate according to the present invention.

Figure 4:
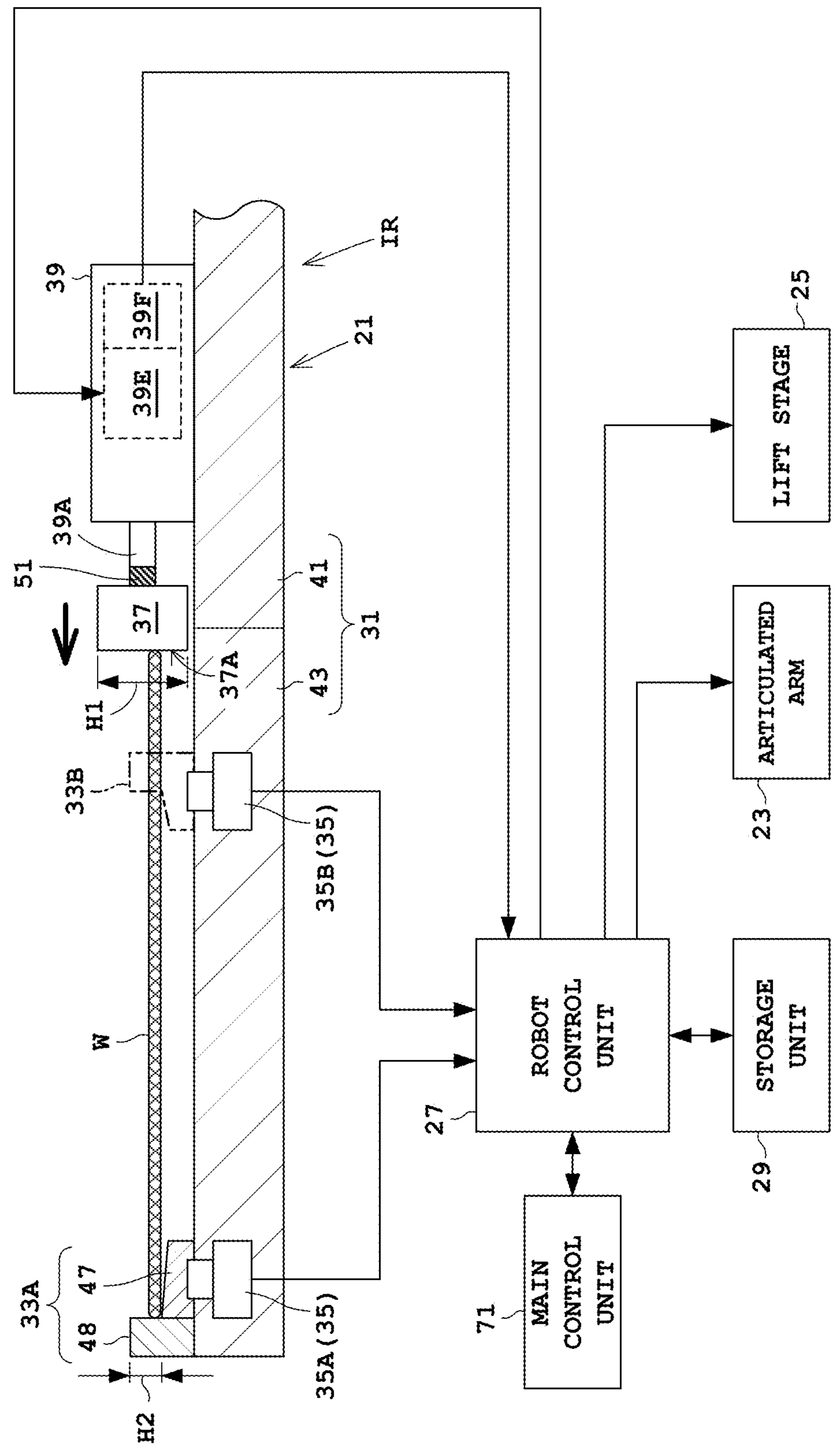
FIG. 4 is a diagram for explaining a configuration of and control performed by the substrate transfer robot according to the first embodiment.

FIGS. 1 and 4 will now be referred to. The substrate transfer robot IR transfers a substrate W (an ordinary substrate WA, a thick edge substrate WB, a first bonded substrate WC, or a second bonded substrate WD). The substrate transfer robot IR transfers the substrate W between the two carriers C on the two carrier tables 7 and a substrate table PS, which is to be described later. The substrate transfer robot IR includes a hand 21 capable of gripping one horizontally-orientated substrate W, and moves the hand 21. FIG. 4 mainly illustrates a longitudinal cross-section of the hand 21, in a view from one side.

The substrate transfer robot IR further includes an articulated arm 23 and a lift stage 25. An example of the articulated arm 23 includes a SCARA robot arm. A proximal end (proximal end portion) of the articulated arm 23 is mounted on the lift stage 25. A distal end (distal end portion) of the articulated arm 23 connects the hand 21. The articulated arm 23 moves the hand 21 supporting the substrate W, in the horizontal directions (XY directions). The lift stage 25 moves the hand 21 and the articulated arm 23 in the vertical directions (Z directions). The articulated arm 23 includes a plurality of electric motors, and the lift stage 25 includes an electric motor.

The substrate transfer robot IR further includes a robot control unit 27 and a storage unit 29 (see FIG. 4). The robot control unit 27 is communicably connected to a main control unit 71, to be described later. The robot control unit 27 controls the components of the substrate transfer robot IR. The robot control unit 27 includes one or more processors such as central processing units (CPUs). The storage unit 29 includes, for example, at least one of a read-only memory (ROM), a random access memory (RAM), and an auxiliary storage device (such as a hard disk). The storage unit 29 stores therein a computer program required in controlling the components of the substrate transfer robot IR.

The articulated arm 23 and the lift stage 25 correspond to a hand actuator according to the present invention. The robot control unit 27 corresponds to a controller according to the present invention.

Figure 5A:
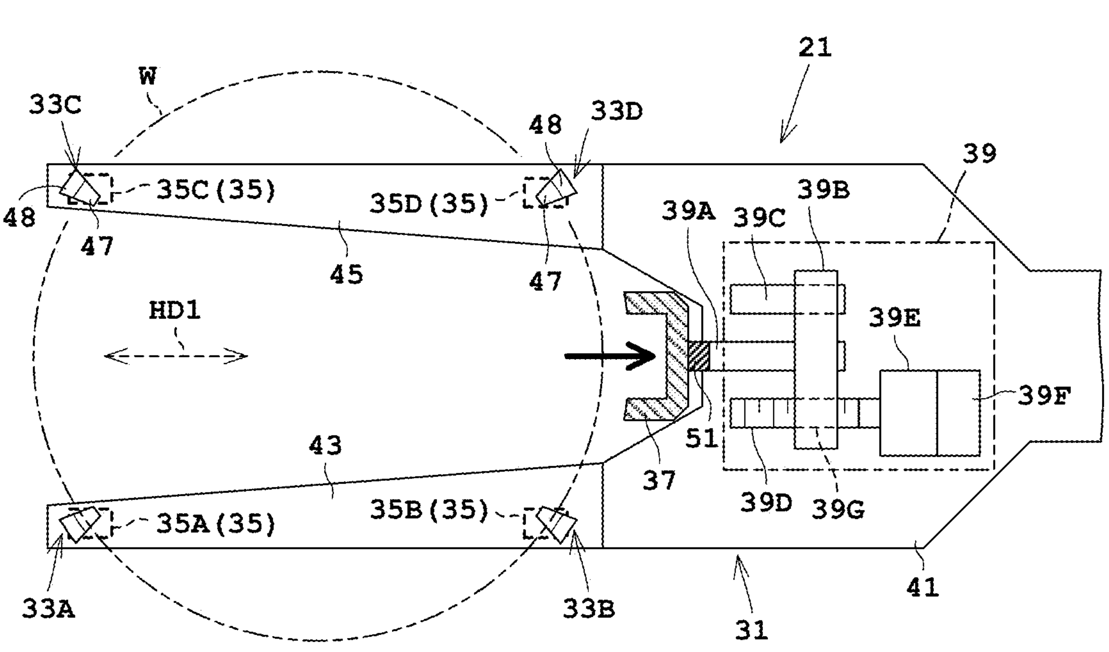
FIG. 5A is a plan view illustrating a hand not gripping a substrate.
Figure 5B:
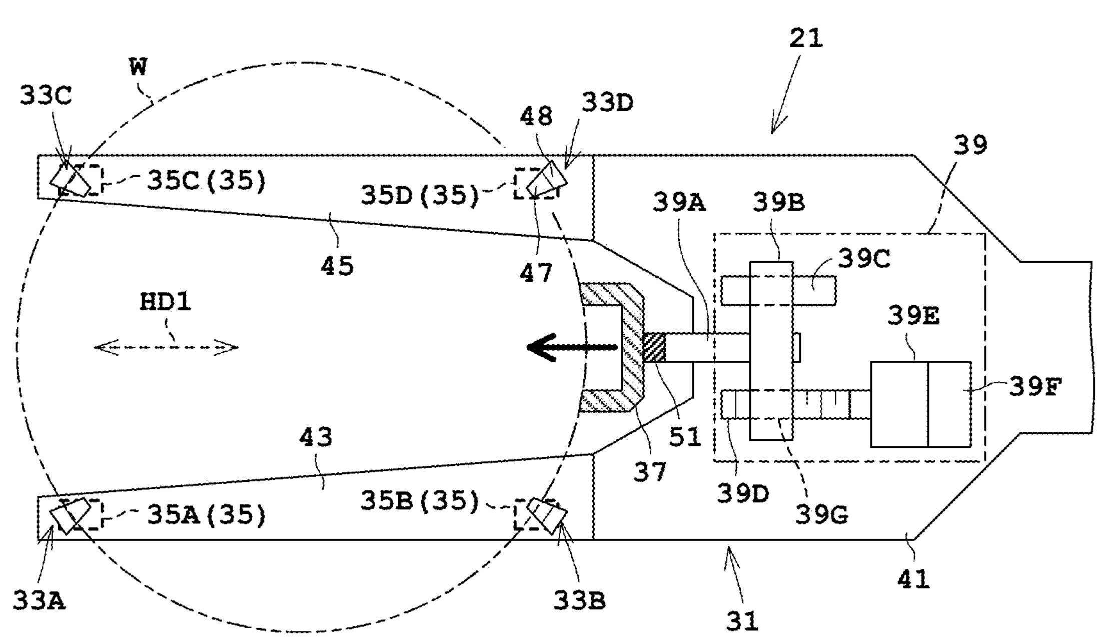
FIG. 5B is a plan view illustrating the hand gripping a substrate.

FIGS. 4, 5A, and 5B will now be referred to. A configuration of the hand 21 will now be described. The hand 21 includes a hand body 31, a plurality of (e.g., 4) guides 33A, 33B, 33C, and 33D, a weight sensor unit 35, a pusher 37, and a pusher actuator 39.

The hand body 31 has a Y shape in plan view. The hand body 31 includes one palm 41 and two fingers 43, 45. The two fingers 43, 45 both extend in a predetermined horizontal direction HD1 from the palm 41. The finger 43 is positioned apart from the finger 45.

The four guides 33A to 33D are provided on the top surface of the hand body 31. Each of the four guides 33A to 33D receives the outer edge portion of the substrate W. The two guides 33A, 33B are provided on the top surface of the finger 43. The two guides 33C, 33D are provided on the top surface of the finger 45. The guide 33A is positioned nearer to the distal end of the finger 43. The guide 33B is disposed nearer to the palm 41 than the guide 33A. The guide 33C is positioned nearer to the distal end of the finger 45. The guide 33D is disposed nearer to the palm 41 than the guide 33C.

Each of the guides 33A to 33D includes a receiving portion 47 and a guide wall 48. An outer edge portion of a horizontally-orientated substrate W is placed on each of the four receiving portions 47. Each of the guides 33A to 33D is configured in such a manner that the top surface of the guide wall 48 is higher than the top surface of the receiving portion 47. The four guide walls 48 thus surround the substrate W placed on the four receiving portions 47, and restrict the movement of the substrate W in the horizontal directions.

The weight sensor unit 35 includes four tactile sensors 35A, 35B, 35C, and 35D. The four tactile sensors 35A, 35B, 35C, and 35D are provided in the four respective guides 33A, 33B, 33C, and 33D. The tactile sensor 35A is provided between the guide 33A corresponding thereto and the hand body 31. The tactile sensor 35D is provided between the guide 33D corresponding thereto and the hand body 31. In other words, the tactile sensor 35A is provided under or on the bottom surface of the guide 33A. The tactile sensor 35D is provided under or on the bottom surface of the guide 33D. The tactile sensors 35B, 35C are provided in the same manner as the tactile sensor 35A (35D). The four tactile sensors 35A to 35D are embedded in the hand body 31.

The four tactile sensors 35A to 35D share to measure the weight of one substrate W placed on the hand 21 (the four guides 33A to 33D). In other words, each of the four tactile sensors 35A to 35D measures the weight of the substrate W applied to the corresponding one of the four guides 33A to 33D. Specifically, the tactile sensor 35A measures the weight of the substrate W, exerted on to the guide 33A (receiving portion 47). Similarly, the tactile sensor 35B measures the weight of the substrate W, exerted on the guide 33B. The tactile sensor 35C measures the weight of the substrate W, exerted on the guide 33C. The tactile sensor 35D measures the weight of the substrate W, exerted on the guide 33D.

Output signals (weight data JA, JB, JC, JD) from the four respective tactile sensors 35A to 35D are sent to the robot control unit 27. The robot control unit 27 calculates the sum of the four weights (weight data JA, JB, JC, JD) measured by the four tactile sensors 35A to 35D, respectively, as a representative value. That is, the robot control unit 27 calculates the sum of the four pieces of weight data JA, JB, JC, and JD. When the ordinary substrate WA illustrated in FIG. 3A is placed on the hand 21, for example, the robot control unit 27 calculates 129 gf (gram weight) as the sum.

The robot control unit 27 may also calculate an average of the four pieces of weight data JA, JB, JC, and JD, as the representative value. The four pieces of weight data JA, JB, JC, and JD, and the calculated sum or average are stored in the storage unit 29, for example.

Each of the four tactile sensors 35A to 35D is, for example, a multi-axis force sensor such as a six-axis force sensor or a three-axis force sensor, but may be a one-axis (Z-axis) force sensor (load cell). Note that the six-axis force sensor is a sensor capable of measuring forces in three axes (Fx, Fy, Fz) and moments in the three axes (Mx, My, Mz). As a sensing method used by the force sensor, piezoresistive, electrostatic capacitive, piezoelectric, or an optical sensing is used, for example.

Each of the two guides 33A, 33C corresponds to a distal guide. The weight sensor unit 35 corresponds to a weight sensor unit according to the present invention. Each of the tactile sensors 35A to 35D corresponds to a weight sensor.

The pusher 37 is mainly used to grip the substrate W. The pusher 37 is disposed on the proximal end of the hand body 31. As illustrated in FIG. 5A, the pusher 37 has a C shape in plan view. The pusher 37 can come into contact with the side surface of the substrate W at two points (two surfaces) corresponding to the respective ends of the C-shape. FIG. 4 will now be referred to. The pusher 37 is configured as follows. The pusher 37 (contact surface 37A) has a height H1 greater than the height H2 of the guide wall 48 of each of the guides 33A to 33D. The top end of the pusher 37 (contact surface 37A) is at a position higher than the top surface of the guide wall 48 of each of the guides 33A to 33D.

The pusher actuator 39 horizontally moves the pusher 37. The pusher actuator 39 causes the two guides 33A, 33C and the pusher 37 to grip by clasping a substrate W that is horizontally orientated on the four guides 33A to 33D therebetween, in the horizontal direction. In other words, the two guides 33A, 33C and the pusher 37 are configured to grip the substrate W that is in the horizontal orientation on the four guides 33A to 33D by clasping the substrate W in the horizontal direction by the pusher actuator 39. As illustrated in FIG. 5A, the pusher actuator 39 includes a rod 39A, a slider 39B, a guide rail 39C, a screw shaft 39D, an electric motor 39E, and a rotary encoder 39F.

The rod 39A extends in the horizontal direction HD1 illustrated in FIG. 5A. The tip of the rod 39A is connected to the pusher 37, with the force sensor 51 therebetween. To the proximal end of the rod 39A, the slider 39B is fixed. The guide rail 39C and the screw shaft 39D are disposed in a manner extending in the horizontal direction HD1. The guide rail 39C passes through the slider 39B. The screw shaft 39D is meshed with an inner screw 39G provided to the slider 39B. An output shaft of the electric motor 39E is connected to one end of the screw shaft 39D.

When the electric motor 39E causes the screw shaft 39D to rotate in a positive direction about the axis, the slider 39B, the rod 39A, and the pusher 37 is moved forward, as illustrated in FIG. 5B. When the electric motor 39E causes the screw shaft 39D to rotate in the reverse direction about the axis, the slider 39B, the rod 39A, and the pusher 37 are moved back, as illustrated in FIG. 5A. The rotary encoder 39F measures the position of the pusher 37 in the horizontal direction HD1 by measuring the amount of the rotational movement (encoder value) of the output shaft of the electric motor 39E and the screw shaft 39D. Although the rotary encoder 39F is used as the position sensor, a linear encoder may also be used instead of the rotary encoder 39F.

Characterizing portions of the present embodiment will now be explained. As illustrated in FIGS. 3A to 3D, there are various types of substrate W, including the ordinary substrate WA, the thick edge substrate WB, the first bonded substrate WC, and the second bonded substrate WD, for example. Among these substrates, for example, the thick edge substrate WB is relatively weak. Therefore, if the hand 21 grips the thick edge substrate WB, the thick edge substrate WB may become damaged.

Figure 6:
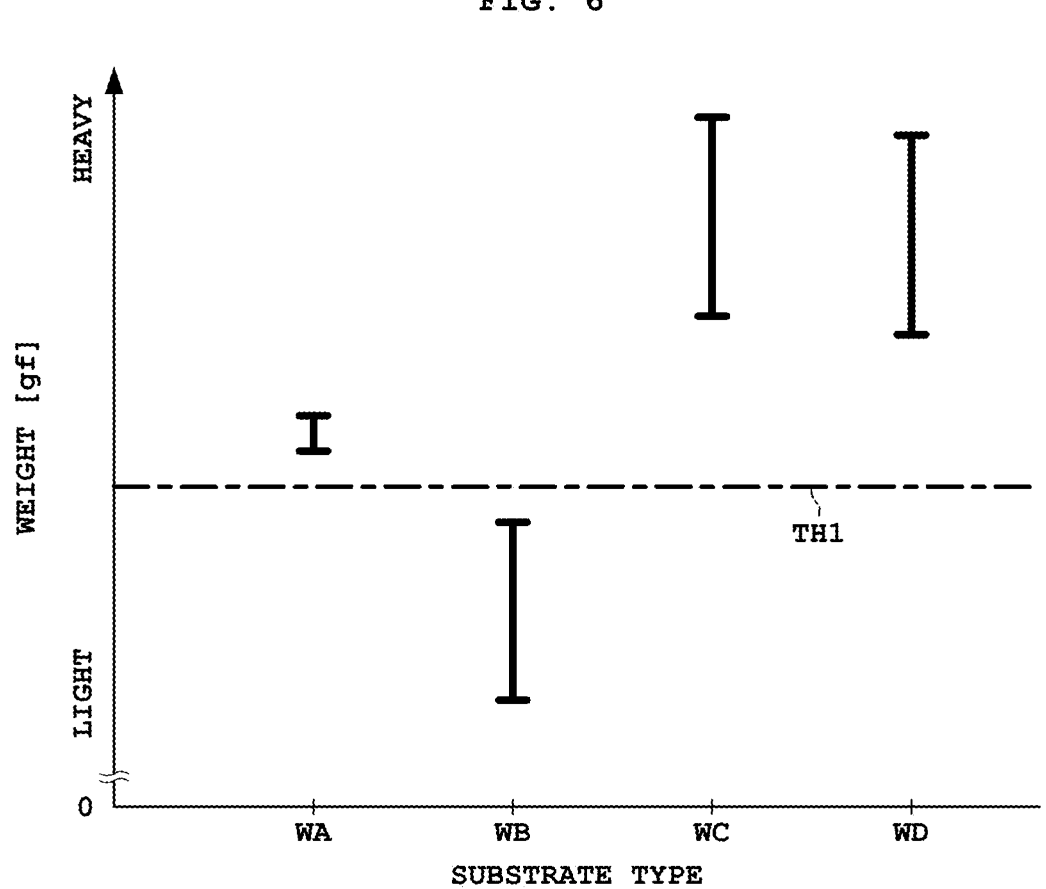
FIG. 6 is a graph illustrating an example of weights of an ordinary substrate, a thick edge substrate, a first bonded substrate, and a second bonded substrate, and thresholds according to the first embodiment.

FIG. 6 is a graph illustrating an example of the weight of each of the ordinary substrate WA, the thick edge substrate WB, the first bonded substrate WC, and the second bonded substrate WD, and a first threshold TH1. The weight of the ordinary silicon substrate WA is about 128 gf, and the thick edge substrate WB is lighter than the ordinary silicon substrate WA. The support substrate 14 included in each of the first bonded substrate WC and the second bonded substrate WD is made of glass. The specific gravity of glass is almost the same as that of silicon. Therefore, the first bonded substrate WC and the second bonded substrate WD are heavier than the ordinary substrate WA. Furthermore, the ordinary substrate WA, the first bonded substrate WC, and the second bonded substrate WD are relatively strong.

Therefore, when the weight (e.g., the sum) measured by the weight sensor unit 35 is more than the first threshold TH1, the robot control unit 27 controls the pusher actuator 39 to achieve a first gripping state in which the substrate W that is on the four guides 33A to 33D is gripped at a first gripping force.

When the weight (e.g., the sum) measured by the weight sensor unit 35 is less than the first threshold TH1, the robot control unit 27 controls the pusher actuator 39 to achieve a first non-gripping state in which the substrate W on the four guides 33A to 33D are not gripped but the substrate W is placed on the four guides 33A to 33D. The operation of the hand 21 will be described later in detail.

In FIG. 6, for example, the thick edge substrates WB have variation (width) in weight, depending on whether the resin film FM is bonded or not. The weights of the first bonded substrates WC and the second bonded substrates WD also vary depending on an acceptable range of the thickness of the support substrate 14. The first threshold TH1 is set between the weight range of the ordinary substrate WA and the weight range of the thick edge substrate WB, in advance.

The description will now return to FIG. 1. The remaining configuration of the substrate processing apparatus 1 will now be explained. The processing block 5 includes a plurality of processing units 61, a center robot CR, and a substrate table PS. The substrate table PS is provided between the substrate transfer robot IR and the center robot CR. One or more substrates W can be placed on the substrate table PS.

The processing units 61 perform preset processing on the substrate W. For example, each of the processing units 61 includes, for example, a holding and rotating unit 63 and a nozzle 65. The holding and rotating unit 63 includes a spin chuck for holding one substrate W in the horizontal orientation, and an electric motor that rotates the spin chuck about a vertical axis passing through the center of the substrate W. The nozzle 65 discharges a treatment liquid (e.g., pure water such as deionized water (DIW)) onto the top surface of the substrate W held by the holding and rotating unit 63. The holding and rotating unit 63 may be a mechanical chuck including a spin base and three or more holding pins arranged at equal intervals about a vertical axis (rotation axis) passing through the center of the spin base. The three or more holding pins grip the substrate W in a horizontal orientation, while keeping the substrate W spaced apart from the top surface of the spin base.

The center robot CR has a configuration similar to that of the substrate transfer robot IR. To explain briefly, the center robot CR includes a hand 21, an articulated arm 23, a lift stage 25, a robot control unit 27, and a storage unit 29, as illustrated in FIGS. 1 and 4. The center robot CR can transfer the substrate W between the plurality of processing units 61 and the substrate table PS. The center robot CR corresponds to the substrate transfer robot according to the present invention.

The substrate processing apparatus 1 includes a main control unit 71 and a storage unit 73 communicably connected to the robot control unit 27. The main control unit 71 includes one or more processors such as central processing units (CPUs). The main control unit 71 controls each component included in the substrate processing apparatus 1. The storage unit 73 includes, for example, at least one of a read-only memory (ROM), a random access memory (RAM), and an auxiliary storage device (such as a hard disk). The storage unit 73 stores therein a computer program required in controlling each of the components included in the substrate processing apparatus 1. The main control unit 71 may correspond to the controller according to the present invention.

<2. Operation of Substrate Processing Apparatus>

Next, an operation of the substrate processing apparatus 1 will be described briefly. A carrier C is placed on one of the two carrier tables 7. The substrate transfer robot IR takes out a substrate W from the carrier C having been placed on the carrier table 7, and transfers the substrate W onto the substrate table PS. The center robot CR picks up the substrate W from the substrate table PS, and transfers the substrate W to any one of the plurality of processing units 61. Each of the processing units 61 performs a preset process (e.g., cleaning with pure water) to the substrate W having been transferred by the center robot CR.

The center robot CR takes out the processed substrate W subjected to the preset process from one of the plurality of processing units 61, and transfers the substrate W onto the substrate table PS. The substrate transfer robot IR then takes out the processed substrate W from the substrate table PS, and returns the substrate W into the carrier C on the carrier table 7.

<3. Operation of Substrate Transfer Robot>

An operation of the substrate transfer robot IR will now be described with reference to the flowchart illustrated in FIG. 7.

[Step S01] Place Substrate on Hand

The substrate transfer robot IR moves the hand 21 having no substrate W thereon into a carrier C. The substrate transfer robot IR then lifts a substrate from a shelf, not illustrated, in the carrier C, while monitoring the outputs from the four tactile sensors 35A to 35D. At this time, the substrate W is placed on the four receiving portions 47 of the four guides 33A to 33D of the hand 21.

[Step S02] Measure Weight of Substrate

The four tactile sensors 35A to 35D measure the weight of the substrate W placed on the hand 21 (the four receiving portions 47). Each of the four tactile sensors 35A to 35D transmits weight data to the robot control unit 27. The four tactile sensors 35A to 35D send the four respective pieces of the weight data JA, JB, JC, and JD to the robot control unit 27. The robot control unit 27 calculates the sum of the four pieces of weight data JA, JB, JC, and JD. The robot control unit 27 may also calculate an average of the four pieces of weight data JA, JB, JC, and JD.

[Step S03] Substrate Weight>First Threshold?

The robot control unit 27 determines whether the calculated sum is more than the first threshold TH1. Specifically, as illustrated in FIG. 6, when the sum is more than the first threshold TH1, the robot control unit 27 determines that the substrate W placed on the hand 21 is one of the ordinary substrate WA, the first bonded substrate WC, and the second bonded substrate WD. By contrast, when the sum is less than the first threshold TH1, the robot control unit 27 determines that the substrate W placed on the hand 21 is the thick edge substrate WB.

If the sum is more than the first threshold TH1, the process is shifted to step S04. If the sum is less than the first threshold TH1, the process is shifted to step S06.

When calculated is the average, the robot control unit 27 determines whether the average is more than the first threshold TH1. In this case, as the first threshold TH1, a value suitable for the determination using an average is set in advance. That is, a different first threshold TH1 is used for the comparison with an average, from the first threshold TH1 used in the comparison with a sum.

[Step S04] Grip Substrate

When the sum (or average) of the four weights measured by the four respective tactile sensors 35A to 35D is more than the first threshold TH1, the robot control unit 27 controls the pusher actuator 39 in the following manner. As illustrated in FIG. 5B, the pusher actuator 39 moves the pusher 37 forward. With this, the two guides 33A, 33C and the pusher 37 are caused to grip by clasping the substrate W on the four guides 33A to 33D therebetween in the horizontal direction HD1.

With this gripping of the substrate W, the first gripping state is achieved. The substrate W is therefore prevented from falling off from the hand 21, for example. The substrate W is gripped at a preset first gripping force. The first gripping force is adjusted on the basis of the load measured by the force sensor 51. In this embodiment, the substrate W to be gripped is any one of the ordinary substrate WA, the first bonded substrate WC, and the second bonded substrate WD.

[Step S05] Transfer Substrate at Predetermined Speed

The robot control unit 27 moves the hand 21 in the first gripping state at a first speed, by controlling the articulated arm 23 and the lift stage 25. The first speed is a preset speed. The first speed is a speed higher than a second speed to be described later. With this setting, the substrate transfer robot IR can transfer the substrate W, efficiently.

[Step S06] Do Not Grip Substrate

When the sum (or average) of the four weights measured by the four respective tactile sensors 35A to 35D is less than the first threshold TH1, the robot control unit 27 controls the pusher actuator 39 in the following manner. For example, the pusher actuator 39 keeps the pusher 37 retracted, as illustrated in FIG. 5A. In other words, the pusher actuator 39 does not move the pusher 37.

As a result, the substrate W on the four guides 33A to 33D is not gripped, and the first non-gripping state in which the substrate W is placed on the four guides 33A to 33D is achieved. The substrate W placed on the four guides 33A to 33D is a thick edge substrate WB. The thick edge substrate WB is relatively weak. Therefore, it is possible to prevent the thick edge substrate WB from becoming damaged by the hand 21 gripping the thick edge substrate WB.

In this step S06, when the sum (or average) of the four weights is less than the first threshold TH1, the robot control unit 27 may control the pusher actuator 39 to achieve the second non-gripping state in which the pusher 37 is moved closer to the substrate W placed on the four guides 33A to 33D. Accordingly, by holding the pusher 37 closely to the substrate W on the four guides 33A to 33D, it is possible to prevent the substrate W from falling while the substrate W is being transferred.

[Step S07] Transfer Substrate at Low Speed

In the first non-gripping state or the second non-gripping state, the robot control unit 27 moves the hand 21 at the second speed lower than the first speed, by controlling the articulated arm 23 and the lift stage 25. When the hand 21 does not grip the substrate W, the substrate W is prevented from falling off from the hand 21 by moving the hand 21 at the second speed (low speed).

According to the present embodiment, the weight sensor unit 35 that measures the weight of the substrate W placed on the hand 21 is provided. When the weight measured by the weight sensor unit 35 is more than the first threshold TH1, the pusher actuator 39 moves the pusher 37 in the horizontal direction. As a result, the horizontally-oriented substrate W on the four guides 33A to 33D is thus gripped by being clasped in the horizontal direction. That is, the substrate W having a weight more than the first threshold TH1 is regarded as a substrate W that is strong enough, and the hand 21 grips such a substrate W selectively. Therefore, it is possible to prevent a damage of the substrate W.

When the weight measured by the weight sensor unit 35 is less than the first threshold TH1, the substrate W is not gripped by the movement of the pusher 37 by the pusher actuator 39. That is, the substrate W having a weight less than the first threshold TH1 is regarded as a substrate W that is not strong enough, so that the hand 21 does not grip the substrate W. Therefore, it is possible to prevent a damage of the substrate W.

When the weight measured by the weight sensor unit 35 is less than the first threshold TH1, the pusher actuator 39 brings the pusher 37 closer to the substrate W. That is, a substrate W having a weight less than the first threshold TH1 is regarded as a substrate W that is not strong enough, so that the hand 21 does not grip the substrate W, but the pusher 37 is moved closer to the substrate W. As a result, because the pusher 37 is held closely to the substrate W, it is possible to prevent the substrate W from being damaged, while preventing the substrate W from falling off from the hand 21 while the substrate is being transferred.

For example, the hand 21 does not grip the substrate W (thick edge substrate WB) that is not strong enough, or grips the substrate W (thick edge substrate WB) at the second gripping force that is weaker than the first gripping force, as in a modification to be described later. Because there is a possibility that the substrate W falls off from the hand 21, the substrate transfer robot IR (center robot CR) needs to transfer the hand 21 having such a substrate W at a low speed. Furthermore, conventional substrate transfer robots cannot distinguish substrates W that are strong enough (e.g., ordinary substrate WA) from the substrates W that are not strong enough (e.g., thick edge substrate WB). Therefore, the substrate transfer robot IR (center robot CR) needs to transfer the substrate W that is strong enough (e.g., ordinary substrate WA) at a low speed that is the speed for transferring the substrate W that is not strong enough (thick edge substrate WB). As a result, the transfer efficiency of the substrate W deteriorates.

In this embodiment, the substrate transfer robot IR (center robot CR) can distinguish substrates W that are strong enough (e.g., ordinary substrate WA) from the substrates W that are not strong enough (e.g., thick edge substrate WB). Therefore, the substrate transfer robot IR (center robot CR) can transfer the substrate W that is strong enough (e.g., ordinary substrate WA) at the first speed, and can transfer the substrate W (thick edge substrate WB) that is not strong enough at the second speed (low speed) lower than the first speed. Therefore, the transfer efficiency of the substrate W can be improved.

The weight sensor unit 35 includes, for example, the four tactile sensors 35A to 35D, and the four tactile sensors 35A to 35D are provided in the four guides 33A to 33D, respectively. As a result, the weight of the substrate W can be measured accurately.

(1) A modification of the first embodiment will now be explained. It has been described that, in step S06, when the sum (or average) of the weights measured by the four tactile sensors 35A to 35D is less than the first threshold TH1, the robot control unit 27 does not grip the substrate W on the four guides 33A to 33D. In this regard, when the sum (or the average) is less than the first threshold TH1, the robot control unit 27 controls the pusher actuator 39 to achieve the second gripping state in which the substrate W on the four guides 33A to 33D is gripped at the second gripping force that is weaker than the first gripping force.

That is, a different gripping force is used between a substrate W that is strong enough and a substrate W that is not strong enough. In addition, the hand 21 grips the substrate W that is not strong enough, that is, that is easily damaged (e.g., the thick edge substrate WB illustrated in FIG. 3B) at the second gripping force weak enough not to damage the substrate W. As a result, the substrate W can be prevented from becoming damaged, while preventing the substrate W from falling off from the hand 21. Furthermore, transfer at a speed faster than the second speed becomes possible.

Second Embodiment

Figure 8:
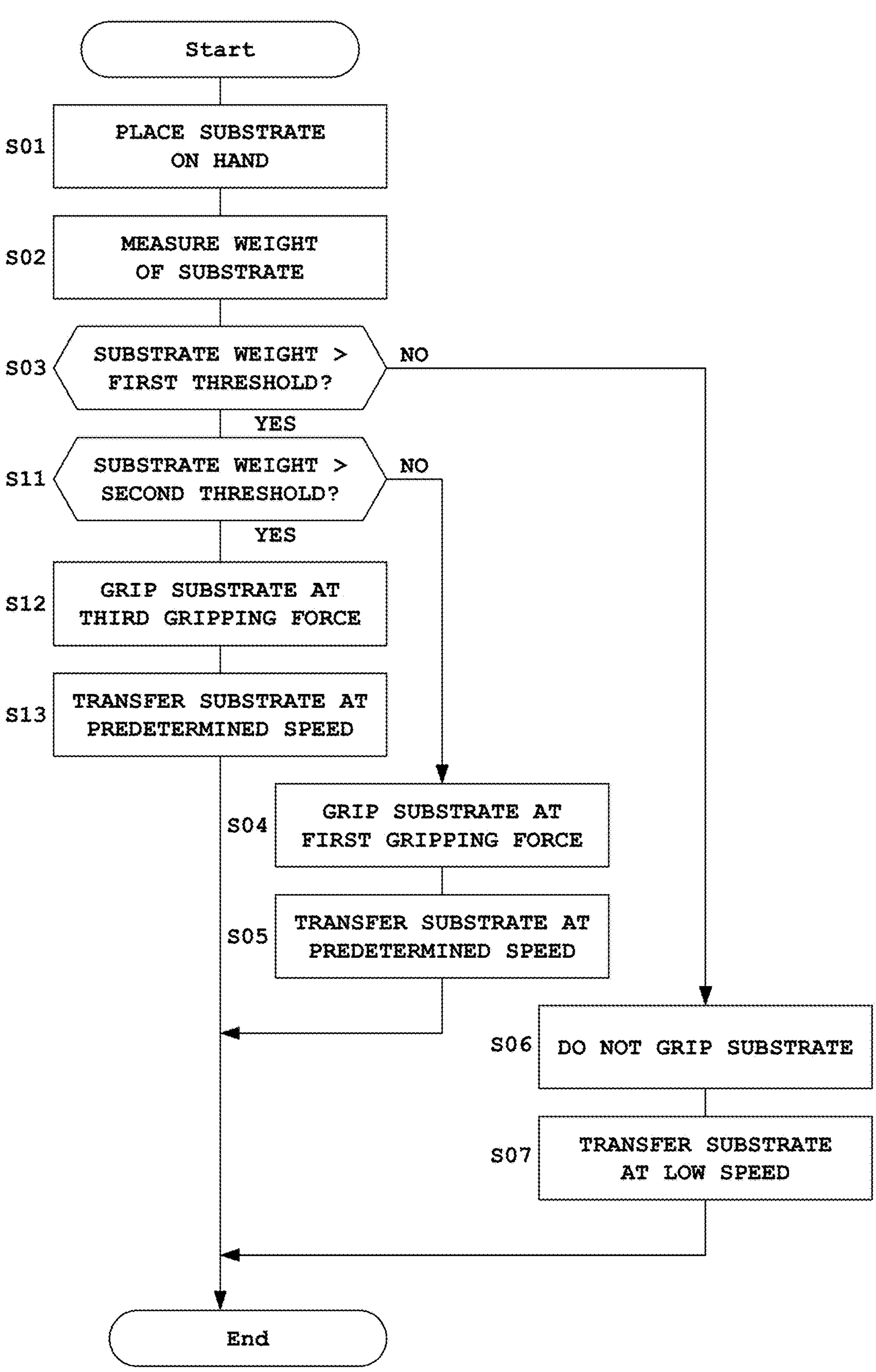
FIG. 8 is a flowchart illustrating an operation performed by a substrate transfer robot according to a second embodiment.
Figure 9:
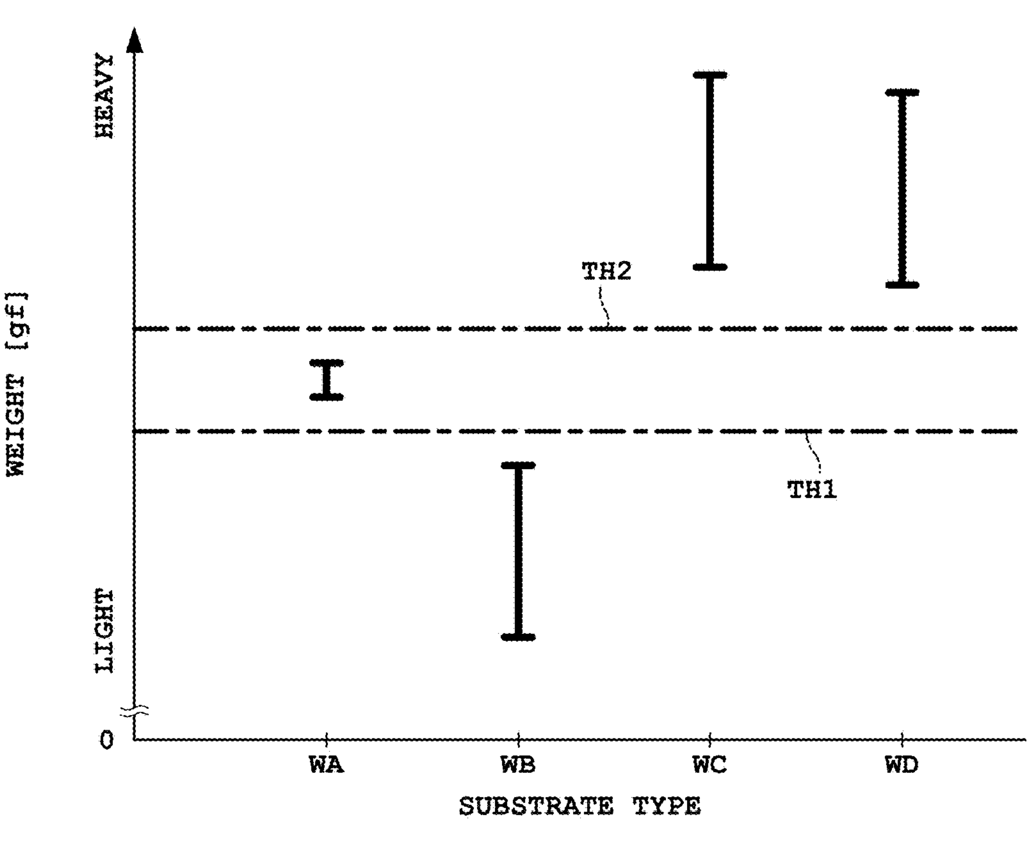
FIG. 9 is a graph illustrating an example of the weights of the substrates and a plurality of thresholds according to the second embodiment.

A second embodiment according to the present invention will now be described with reference to drawings. Note that redundant descriptions with those in the first embodiment will be omitted. FIG. 8 is a flowchart illustrating an operation performed by a substrate transfer robot IR according to the second embodiment. FIG. 9 is a graph illustrating an example of the weight of each type of substrates W, the first threshold TH1, and the second threshold TH2 according to the second embodiment.

In the first embodiment, the thick edge substrate WB and the ordinary substrate WA and the like are distinguished by setting the first threshold TH1 in advance. In the second embodiment, as illustrated in FIG. 8, a second threshold TH2 may be set in advance, in addition to the first threshold TH1, so as to distinguish the thick edge substrate WB, the ordinary substrate WA, the first bonded substrate WC, and the like.

FIG. 9 will now be referred to. The second threshold TH2 is set between the weight range of the ordinary substrates WA and the weight range of the first bonded substrates WC and the second bonded substrates WD. With this, it is possible to determine that the first bonded substrate WC and the second bonded substrate WD are heavier than the ordinary substrate WA. The second threshold TH2 is greater than the first threshold TH1.

<4. Operation of Substrate Transfer Robot>

An operation of the substrate transfer robot IR will now be described with reference to the flowchart illustrated in FIG. 8.

The substrate transfer robot IR places a substrate W on the hand 21 (step S01). The four tactile sensors 35A to 35D then measure the weight of the substrate W placed on the hand 21 (step S02). The robot control unit 27 determines whether the sum of the four pieces of weight data JA, JB, JC, and JD measured by the four respective tactile sensors 35A to 35D is more than the first threshold TH1 (step S03). If the sum is more than the first threshold TH1, the process is shifted to step S11. If the sum is less than the first threshold TH1, the process is shifted to step S06.

[Step S11] Substrate Weight>Second Threshold?

The robot control unit 27 determines whether the calculated sum is more than the second threshold TH2. Specifically, as illustrated in FIG. 9, when the sum is more than the second threshold TH2, the robot control unit 27 determines that the substrate W placed on the hand 21 is one of the first bonded substrate WC and the second bonded substrate WD. By contrast, when the sum is less than the second threshold TH2, the robot control unit 27 determines that the substrate W placed on the hand 21 is an ordinary substrate WA.

If the sum is more than the second threshold TH2, the process is shifted to step S12. If the sum is less than the second threshold TH2, the process is shifted to step S04. When calculated is the average, the robot control unit 27 determines whether the average is more than the second threshold TH2. In this case, too, as the second threshold TH2, a value suitable for the determination using an average is set in advance.

[Step S12] Grip Substrate

When the sum (or average) of the four weights measured by the four respective tactile sensors 35A to 35D is more than the second threshold TH2, the robot control unit 27 controls the pusher actuator 39 in the following manner. As illustrated in FIG. 5B, the pusher actuator 39 moves the pusher 37 forward. As a result, the hand 21 (two guides 33A, 33C and a pusher 37) together grip the substrate W.

In addition, the hand 21 achieves a third gripping state in which the substrate W on the four guides 33A to 33D is gripped at a third gripping force that is different from the first gripping force. For example, it is assumed that the thick edge substrate 12 and the entirely-thin substrate 16 illustrated in FIGS. 3C and 3D are made of silicon, and the support substrate 14 is made of glass. It is also assumed that the support substrate 14 has a diameter larger than the diameters of the thick edge substrate 12 and the entirely-thin substrate 16. In such a case, because glass is more brittle than silicon, the support substrate 14 may be become damaged. Therefore, the third gripping force may be set to be weaker than the first gripping force. The third gripping force is set greater than the second gripping force (first gripping force>third gripping force>second gripping force).

[Step S13] Transfer Substrate at Predetermined Speed

The robot control unit 27 moves the hand 21 in the third gripping state at the first speed, by controlling the articulated arm 23 and the lift stage 25. The first speed is a speed higher than the second speed. In this regard, for example, when the third gripping force is set weaker than the first gripping force, the robot control unit 27 may move the hand 21 in the third gripping state at a third speed lower than the first speed but higher than the second speed (first speed>third speed>second speed). As a result, because the hand 21 is moved slower than the first speed, even if the substrate W is gripped at the third gripping force weaker than the first gripping force, it is possible to prevent the substrate W gripped by the hand 21 from falling. In addition, because the substrate W is moved faster than the second speed, the substrate W can be transferred relatively efficiently.

Furthermore, for example, when the third gripping force is set stronger than the first gripping force, the robot control unit 27 may move the hand 21 in the third gripping state at the third speed higher than the first speed and the second speed (third speed>first speed>second speed).

Figure 7:
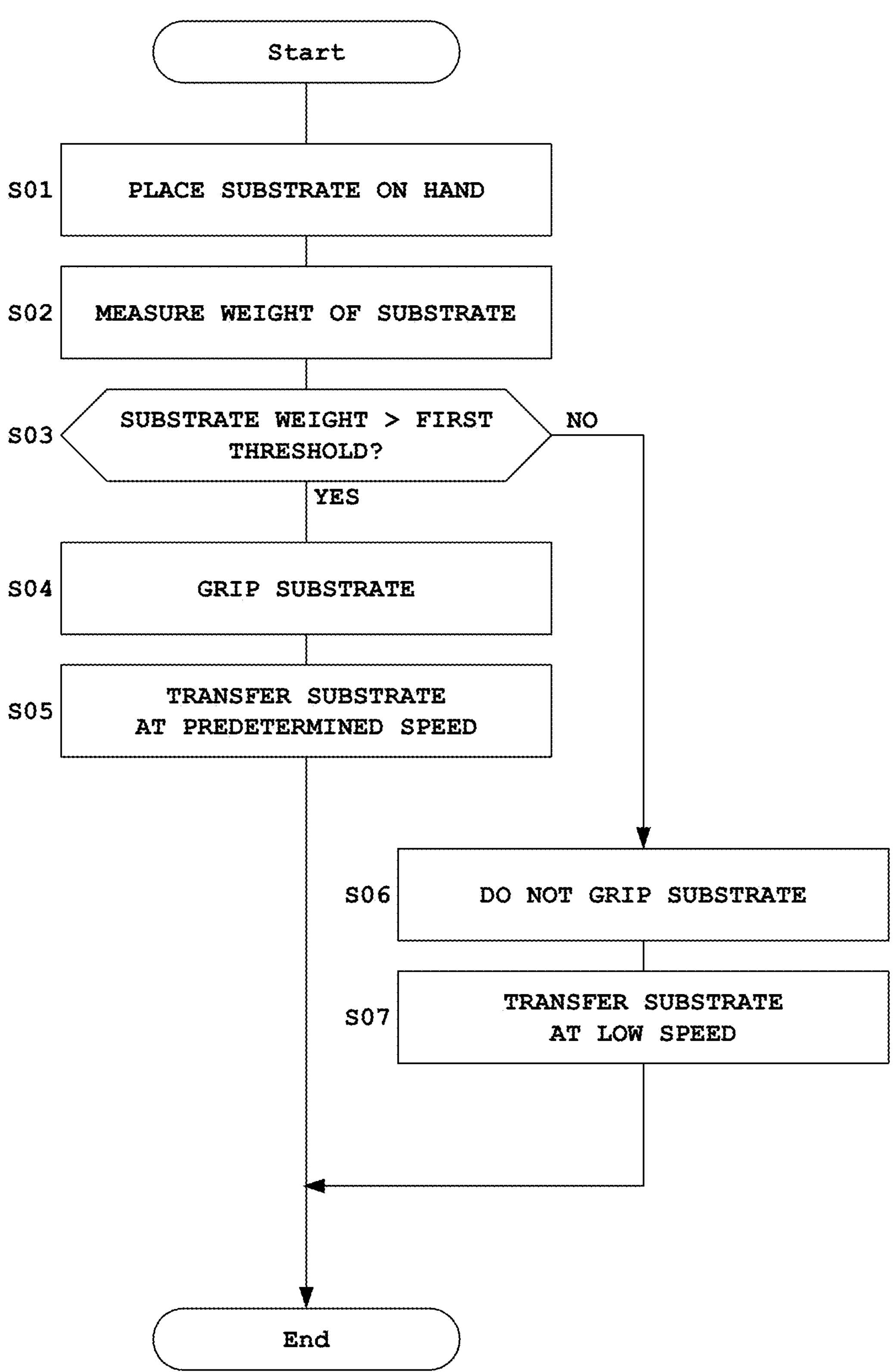
FIG. 7 is a flowchart illustrating an operation performed by the substrate transfer robot according to the first embodiment.

Note that the operations in steps S04, S05, S06, and S07 illustrated in FIG. 8 are the same as those in steps S04, S05, S06, and S07 illustrated in FIG. 7, and therefore, description thereof is omitted.

According to this embodiment, when the weight measured by the weight sensor unit 35 is more than the second threshold TH2 (second threshold TH2>first threshold TH1), the substrate W is gripped at the third gripping force that is different from the first gripping force, with the movement of the pusher 37 by the pusher actuator 39. As a result, by further distinguishing the substrates W that are strong enough into two types of substrates W (the first bonded substrate WC and the second bonded substrate WD), it is possible to set the optimum gripping force for each of these two types of substrates W.

Furthermore, because glass is more brittle than silicon, the support substrate 14 may be become damaged. Therefore, the first bonded substrate WC and the second bonded substrate WD having weights more than the second threshold TH2 is gripped at the third gripping force that is weaker than the first gripping force. With this, it is possible to prevent damages of the first bonded substrate WC and the second bonded substrate WD.

(1) A first modification of the second embodiment will now be explained. In FIG. 8, step S11 has been explained to be performed after step S03. In this regard, step S03 may be performed after step S11 is performed. That is, the order of the two steps S03 and S11 in FIG. 8 may be reversed.

(2) A second modification of the second embodiment will now be explained. In the example illustrated in FIG. 8, because the weight range of the first bonded substrates WC partially overlaps with the weight range of the second bonded substrates WD, the first bonded substrates WC cannot be distinguished from the second bonded substrates WD by weight. However, when the weight range of the first bonded substrates WC does not overlap the weight range of the second bonded substrates WD, it is possible to distinguish the first bonded substrates WC from the second bonded substrates WD by the weight.

Figure 10:
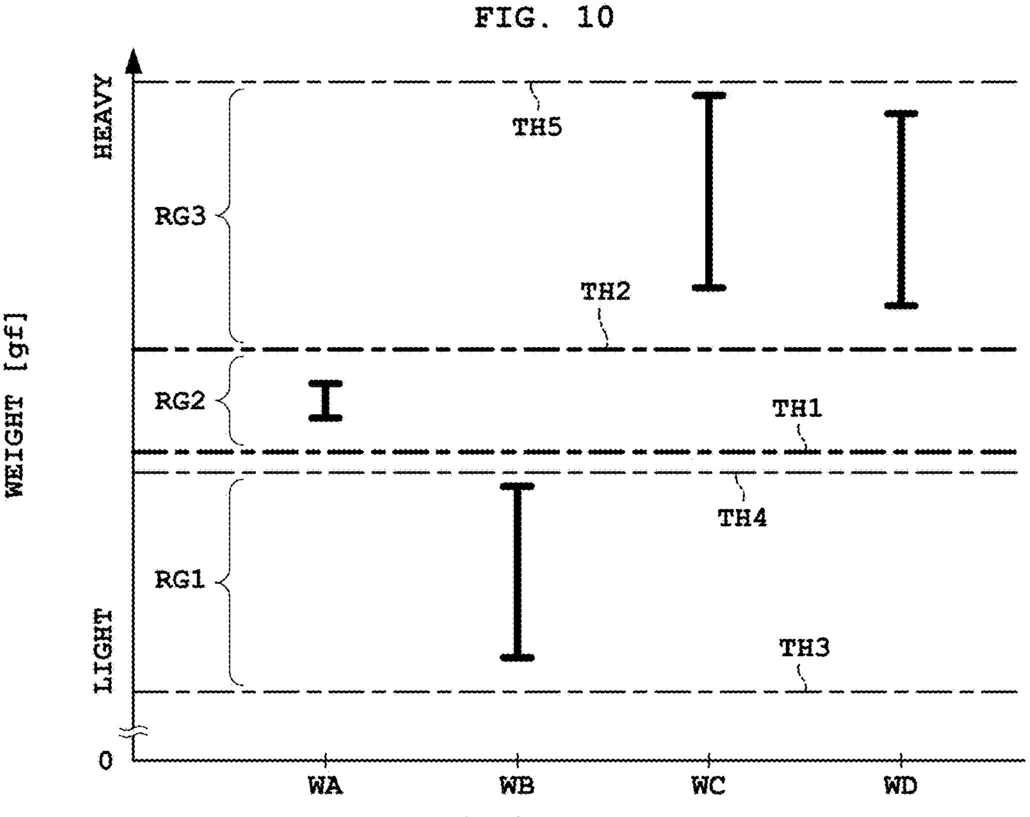
FIG. 10 is a graph illustrating an example of the weights of the substrates and a plurality of thresholds according to a modification of the second embodiment.

(3) A third modification of the second embodiment will now be explained. FIG. 10 will now be referred to. For example, a third threshold TH3, a fourth threshold TH4, and a fifth threshold TH5 are further set in advance. The robot control unit 27 may then determine which type the substrate W on the hand 21 corresponds to, on the basis of which one of three ranges RG1, RG2, and RG3 the sum (or the average) of the four pieces of the weight measurement data JA, JB, JC, and JD belongs.

In FIG. 10, the range RG1 is a range between the third threshold TH3 and the fourth threshold TH4. The range RG2 is a range between the first threshold TH1 and the second threshold TH2. The range RG3 is a range between the second threshold TH2 and the fifth threshold TH5. The third threshold TH3, the fourth threshold TH4, the first threshold TH1, the second threshold TH2, and the fifth threshold TH5 become greater in the order listed herein (third threshold TH3<fourth threshold TH4<first threshold TH1<second threshold TH2<fifth threshold TH5).

For example, when the sum is more than the first threshold TH1 and less than the second threshold TH2, the sum falls within the range RG2. In such a case, it can be identified that the substrate W placed on the hand 21 is the ordinary substrate WA. When the sum is less than the first threshold TH1 and more than the third threshold TH3, the sum falls within the range RG1. In such a case, it can be identified that the substrate W placed on the hand 21 is the thick edge substrate WB.

When the sum is more than the second threshold TH2 and less than the fifth threshold TH5, the sum falls within the range RG3. In this case, it can be identified that the substrate W on the hand 21 is the first bonded substrate WC or the second bonded substrate WD.

In FIG. 10, the range RG1 may be a range between the third threshold TH3 and the first threshold TH1. The range RG2 may be a range between the first threshold TH1 and a sixth threshold, not illustrated, that is less than the second threshold TH2. In this case, the range RG3 remains as the range between the second threshold TH2 and the fifth threshold TH5.

Third Embodiment

A third embodiment according to the present invention will now be described with reference to drawings. Note that redundant descriptions with those in the first and the second embodiments will be omitted. FIG. 11 is a diagram for explaining a configuration of and control performed by the substrate transfer robot IR according to the third embodiment.

In the first and the second embodiments, the first gripping force and the second gripping force of the substrate W have been explained as being adjusted on the basis of the load measured by the force sensor 51 disposed between the pusher 37 and the rod 39A. In this regard, the first gripping force and the second gripping force for gripping the substrate W may be adjusted by the rate of temporal changes in at least one of a torque of the electric motor 39E and the encoder value. Note that the substrate transfer robot IR illustrated in FIG. 11 according to the third embodiment does not include the force sensor 51.

The robot control unit 27 is connected to the electric motor 39E and the rotary encoder 39F in the pusher actuator 39 by wiring. An example of the electric motor 39E is a stepping motor. The robot control unit 27 moves the pusher 37 forward by controlling the pusher actuator 39. At that time, the robot control unit 27 controls the electric motor 39E, on the basis of position information (encoder value) output from the rotary encoder 39F. The robot control unit 27 can detect a driving current supplied to the electric motor 39E, as driving current information using a current value sensor (not illustrated), for example. The robot control unit 27 then determines that the pusher 37 has come to abutment against (comes into contact with) the side surface of the substrate W by monitoring any one or both of the position information and the driving current information.

That is, when the pusher 37 comes into abutment against the side surface of the substrate W, the movement of the pusher 37 is temporarily obstructed. Therefore, a displacement in the position information output from the rotary encoder 39F exhibits a temporary stop. In addition, in order to move the pusher 37 further toward the side surface of the substrate W even after the pusher 37 comes into abutment against the side surface of the substrate W, it is necessary to increase the torque of the electric motor 39E. Therefore, the driving current to the electric motor 39E exhibits an increase, and the driving current information becomes displaced. Therefore, by monitoring one or both of the position information and the driving current information, it is possible to determine that the pusher 37 has come into abutment against the side surface of the substrate W, accurately. After the pusher 37 comes into contact with the side surface of the substrate W, the robot control unit 27 grips the substrate W by adjusting the force by which the pusher 37 is biased (the degree by which the pusher 37 is pushed) against the side surface of the substrate W.

According to this embodiment, the pusher actuator 39 includes the electric motor 39E that drives to move the pusher 37 forward and backward, a driving circuit 39H that applies a driving current for driving the electric motor 39E, and the rotary encoder 39F that detects the rotational position of the electric motor 39E. The robot control unit 27 performs at least one of detecting the abutment (contact) on the basis of the driving current information of the driving circuit 39H and detecting the abutment on the basis of position information (encoder value) output from the rotary encoder 39F. That is, the robot control unit 27 determines that the pusher 37 comes into abutment against the side surface of the substrate W on the basis of at least one of the driving current information and the position information.

Therefore, it is not necessary to provide the force sensor 51 or the like to detect that the pusher 37 has come into abutment against the side surface of the substrate W. As a result, the structure can be simplified, and the cost can be reduced.

The present invention is not limited to the embodiments described above, and following modifications are still possible.

(1) In each of the embodiments described above, the weight sensor unit 35 of the hand 21 includes the four tactile sensors 35A to 35D. The four tactile sensors 35A to 35D are provided in the four guides 33A to 33D, respectively. In this regard, the weight sensor unit 35 may include at least one tactile sensor 35A. For example, one tactile sensor 35A may be provided to any of the four guides 33A to 33D. Furthermore, in a configuration in which the weight sensor unit 35 includes two tactile sensors 35A, 35B, the two tactile sensors 35A, 35B may be provided to any of the four guides 33A to 33D. That is, the hand 21 may include one to three tactile sensors 35A that are provided to the four guides 33A to 33D, for example.

When the weight measured by the one tactile sensor 35A is more than the first threshold TH1, for example, the robot control unit 27 may control the pusher actuator 39 to achieve the first gripping state in which the substrate W on the four guides 33A to 33D is gripped at the first gripping force, for example. Because it is not necessary to provide the same number of weight sensors as the number of four guides 33A to 33D, the configuration of the hand 21 can be simplified.

(2) In each of the embodiments and the modification (1) described above, the hand 21 illustrated in FIGS. 4 and 5A includes the four guides 33A to 33D. In this regard, the hand 21 illustrated in FIG. 4 and the like may include three or more guides. In FIG. 5A, the two guides 33B, 33D on the side of the palm 41 are provided in the fingers 43, 45, respectively. In this regard, the two guides 33B, 33D may be provided to the palm 41.

Figure 12:
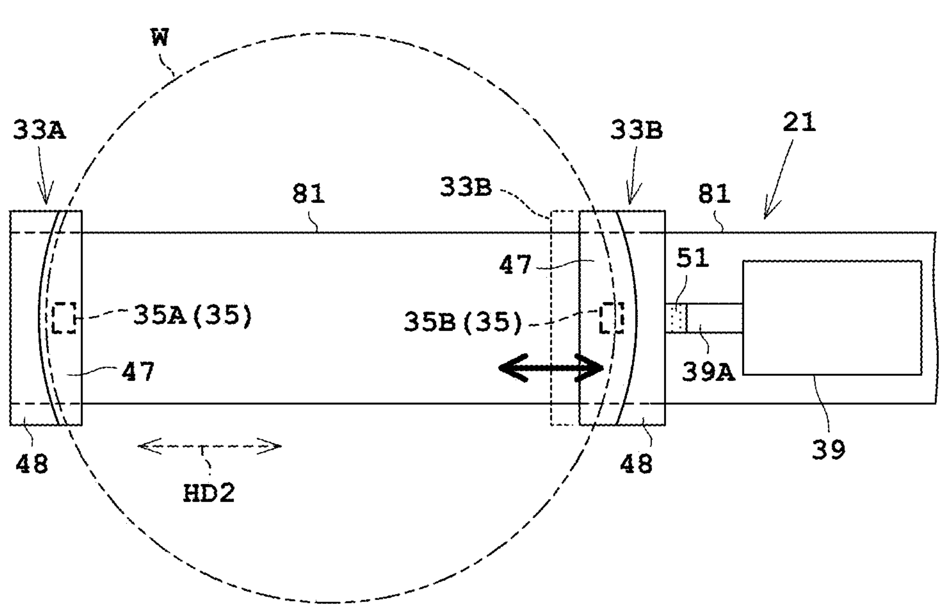
FIG. 12 is a plan view illustrating a hand according to a modification.

(3) In each of the embodiments and the modifications, the hand 21 includes the four guides 33A to 33D. In this regard, the hand 21 may include a linear guide body 81 and two guides 33A, 33B, as illustrated in FIG. 12. The two guides 33A, 33B are provided on the top surface of the guide body 81 along a horizontal direction HD2 in which the guide body 81 extends. In this case, the hand 21 includes, for example, two tactile sensors 35A, 35B correspondingly to the two guides 33A, 33B, respectively. Note that the guide 33A illustrated in FIG. 12 corresponds to the distal guide according to the present invention.

Furthermore, the rod 39A of the pusher actuator 39 may be connected to the guide 33B illustrated in FIG. 12, with the force sensor 51 disposed therebetween. The pusher actuator 39 may move the guide 33B illustrated in FIG. 12 forward and backward in the horizontal directions HD2. That is, the guide 33B illustrated in FIG. 12 may have a function of the pusher 37.

Figure 13:
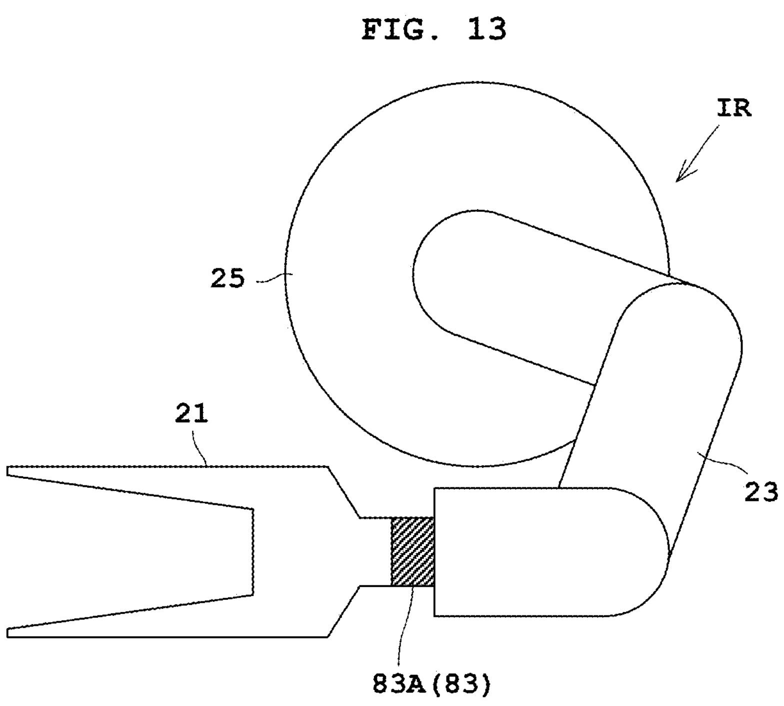
FIG. 13 is a plan view illustrating a weight sensor unit provided between a hand and an articulated arm according to a modification.

(4) In each of the embodiments and the modifications, the hand 21 includes the weight sensor unit 35 (four tactile sensors 35A to 35D) provided between the respective four guides 33A to 33D and the hand body 31, as illustrated in FIG. 4. In this regard, the distal end of the articulated arm 23 may be connected to the hand 21 via a weight sensor unit 83 (see FIG. 13). Such a weight sensor unit 83 includes one three-axial or six-axial force sensor 83A, for example. The weight sensor unit 83 (force sensor 83A) measures the weight of the substrate W placed on the guides 33A to 33D, in replacement of the weight sensor unit 35.

(5) In each of the embodiments and the modifications, each of the substrate transfer robot IR and the center robot CR includes the articulated arm 23 and the lift stage 25 for moving the hand 21. In this regard, each of the substrate transfer robot IR and the center robot CR may include an advancing and retracting unit and a lifting and rotating unit (neither of which are illustrated). The advancing and retracting unit advances and retracts the hand 21. The lifting and rotating unit lifts and lowers the hand 21 and the advancing and retracting unit, and rotates the hand 21 and the advancing and retracting unit about the vertical axis. The substrate transfer robot IR may further include a horizontal actuator that moves the hand 21, the advancing and retracting unit, and the lifting and rotating unit, in the Y direction along which the two carrier tables 7 are aligned. Each one of the advancing and retracting unit, the lifting and rotating unit, and the horizontal actuator includes one or more electric motors.

(6) In each of the embodiments and the modifications, the robot control unit 27 may change the gripping force for gripping the substrate W on the four guides 33A to 33D, for example, by controlling the pusher actuator 39 on the basis of the weight measured by the weight sensor unit 35. As a result, the substrate W can be gripped at a gripping force suitable for the weight of the substrate. Therefore, it is possible prevent a damage of the substrate. The gripping force may also be changed to zero. That is, the substrate W is sometimes not gripped, correspondingly to the weight of the substrate W.

(7) In each of the embodiments and the modifications, the robot control unit 27 may change the transfer speed of the hand 21 by controlling the hand actuator (the articulated arm 23 and the lift stage 25) according to the weight measured by the weight sensor unit 35. As a result, it is possible to transfer the substrate W at a transfer speed suitable for the weight of the substrate W, while the substrate is gripped at a gripping force suitable for the weight of the substrate W. If the transfer speed is fixed at a speed low enough not for the substrate W to fall off from the hand 21, the efficiency of transfer of the substrate W deteriorates. However, because the transfer speed is changed depending on the weight, it is possible to improve the transfer efficiency of the substrate W while preventing a damage of the substrate W.

The present invention may be embodied in other specific forms without departing from the spirit or essential attributes thereof and, accordingly, reference should be made to the appended claims, rather than to the foregoing specification, as indicating the scope of the invention.

What is claimed is:

1. A substrate transfer robot that transfers a substrate, the substrate transfer robot comprising:
- a hand capable of gripping the substrate in a horizontal orientation; and
- a controller,
- wherein the hand includes:
  - a hand body;
  - a plurality of guides provided on a top surface of the hand body and receiving an outer edge portion of the substrate, and including a distal guide disposed on a distal end of the hand body;
  - a pusher disposed on a proximal end of the hand body and capable of coming into contact with a side surface of the substrate;
  - a pusher actuator that moves the pusher horizontally; and
  - a weight sensor unit that measures a weight of the substrate placed on the hand, and
- the distal guide and the pusher are caused by the pusher actuator to grip the substrate that is in the horizontal orientation on the plurality of guides, by clasping the substrate in the horizontal direction, and
- the controller changes a gripping force for gripping the substrate on the plurality of guides by controlling the pusher actuator depending on the weight measured by the weight sensor unit.

2. The substrate transfer robot according to claim 1, wherein, when the weight measured by the weight sensor unit is more than a first threshold, the controller controls the pusher actuator to achieve a first gripping state in which the substrate on the plurality of guides is gripped at a first gripping force.

3. The substrate transfer robot according to claim 2, wherein, when the weight measured by the weight sensor unit is less than the first threshold, the controller controls the pusher actuator to achieve a first non-gripping state in which the substrate is placed on the plurality of guides without being gripped on the plurality of guides.

4. The substrate transfer robot according to claim 3, further comprising a hand actuator that moves the hand,
- wherein the controller controls the hand actuator to move the hand in the first gripping state at a first speed, and the controller controls the hand actuator to move the hand in the first non-gripping state at a second speed that is lower than the first speed.

5. The substrate transfer robot according to claim 2, wherein, when the weight measured by the weight sensor unit is less than the first threshold, the controller controls the pusher actuator to achieve a second non-gripping state in which the pusher is moved closer to the substrate placed on the plurality of guides.

6. The substrate transfer robot according to claim 2, wherein, when the weight measured by the weight sensor unit is less than the first threshold, the controller controls the pusher actuator to achieve a second gripping state in which the substrate on the plurality of guides are gripped at a second gripping force that is weaker than the first gripping force.

7. The substrate transfer robot according to claim 2, wherein, when the weight measured by the weight sensor unit is more than a second threshold that is greater than the first threshold, the controller controls the pusher actuator to achieve a third gripping state in which the substrate on the plurality of guides is gripped at a third gripping force different from the first gripping force.

8. The substrate transfer robot according to claim 7, wherein the substrate includes a bonded substrate, the bonded substrate includes a silicon substrate made of silicon and a support substrate made of glass and bonded to a bottom surface of the silicon substrate, the support substrate has a diameter larger than a diameter of the silicon substrate, the bonded substrate has a weight more than the second threshold, and the third gripping force is set to be weaker than the first gripping force.

9. The substrate transfer robot according to claim 2, wherein the weight sensor unit includes a plurality of weight sensors, the plurality of weight sensors are provided in the respective plurality of guides, each of the plurality of weight sensors measures a weight of the substrate exerted on corresponding one of the plurality of guides, and when a representative value of a plurality of weights measured by the plurality of respective weight sensors is more than the first threshold, the controller controls the pusher actuator to achieve the first gripping state in which the substrate on the plurality of guides is gripped at the first gripping force.

10. The substrate transfer robot according to claim 9, wherein the representative value is a sum.

11. The substrate transfer robot according to claim 9, wherein the representative value is an average.

12. The substrate transfer robot according to claim 2, wherein the weight sensor unit includes a weight sensor, the weight sensor is provided to any one of the plurality of guides, and when the weight measured by the weight sensor is more than the first threshold, the controller controls the pusher actuator to achieve the first gripping state in which the substrate on the plurality of guides is gripped at the first gripping force.

13. The substrate transfer robot according to claim 1, further comprising a hand actuator that moves the hand, wherein the controller changes a transfer speed of the hand by controlling the hand actuator depending on the weight measured by the weight sensor unit.

14. A substrate processing apparatus that processes a substrate, the substrate processing apparatus comprising:

a substrate transfer robot that transfers the substrate;

a processing unit that performs a preset process to the substrate having been transferred by the substrate transfer robot; and a controller, wherein the substrate transfer robot includes a hand capable of gripping the substrate in a horizontal orientation, the hand includes:

a hand body;

a plurality of guides provided on a top surface of the hand body and receiving an outer edge portion of the substrate, and including a distal guide disposed on a distal end of the hand body;

a pusher disposed on a proximal end of the hand body and capable of coming into contact with a side surface of the substrate;

a pusher actuator that moves the pusher horizontally; and a weight sensor unit that measures a weight of the substrate placed on the hand, the distal guide and the pusher are caused by the pusher actuator to grip the substrate that is in the horizontal orientation on the plurality of guides, by clasping the substrate in the horizontal direction, and the controller changes a gripping force for gripping the substrate on the plurality of guides by controlling the pusher actuator depending on the weight measured by the weight sensor unit.

* * * * *